US012693876B2

(12) United States Patent
Park et al.

(10) Patent No.: US 12,693,876 B2
(45) Date of Patent: Jul. 28, 2026

(54) ELECTRONIC DEVICE AND OPERATION METHOD THEREOF

(71) Applicant: SAMSUNG ELECTRONICS CO., LTD., Suwon-si (KR)

(72) Inventors: Gyeongtae Park, Suwon-si (KR); Moonjeong Kim, Suwon-si (KR); Myunghoon Kwak, Suwon-si (KR); Jookwan Lee, Suwon-si (KR); Yangwook Kim, Suwon-si (KR); Jihea Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 110 days.

(21) Appl. No.: 18/230,479

(22) Filed: Aug. 4, 2023

(65) Prior Publication Data

US 2023/0376322 A1      Nov. 23, 2023

Related U.S. Application Data

(63) Continuation of application No. PCT/KR2022/012426, filed on Aug. 19, 2022.

(30) Foreign Application Priority Data

Oct. 12, 2021      (KR) ........................ 10-2021-0135171

(51) Int. Cl.
      *G06F 3/0483*      (2013.01)
      *G06F 9/451*      (2018.01)
      *G06F 16/16*      (2019.01)
(52) U.S. Cl.
      CPC ............ *G06F 9/451* (2018.02); *G06F 3/0483* (2013.01); *G06F 16/168* (2019.01)

(58) Field of Classification Search
      CPC ................... G06F 9/451; G06F 16/168; G06F 2203/04803; G06F 1/1624; G06F 1/1652;
      (Continued)

(56) References Cited

U.S. PATENT DOCUMENTS

| | | | |
|---|---|---|---|
| 8,423,911 | B2 | 4/2013 | Chaudhri |
| 8,606,328 | B2 | 12/2013 | Anzai |

(Continued)

FOREIGN PATENT DOCUMENTS

| | | |
|---|---|---|
| JP | 2009130880 A | 6/2009 |
| KR | 20100124427 A | 11/2010 |

(Continued)

OTHER PUBLICATIONS

International Search Report for International Application No. PCT/KR2022/012426; International Filing Date Aug. 19, 2022; Date of Mailing Dec. 1, 2022; 6 Pages.

(Continued)

*Primary Examiner* — Tuyetlien T Tran
(74) *Attorney, Agent, or Firm* — CANTOR COLBURN LLP

(57)      ABSTRACT

An electronic device includes a housing, a display including a flexible display having a first state where a portion of a display area is drawn into the housing and a second state where a portion of the display area is drawn out of the housing as the flexible display is deformed or moved, a sensor, a memory, and a processor. The memory stores instructions to display a first user interface including an object on the display when the display is in the first state, identify a degree of the display area drawn out of the housing by using the sensor, display at least one user interface that is distinguished based on the identified degree so as to be distinguished from each other when the display is in the second state, and perform a specified function (Continued)

related to the object in response to a user input related to the object.

16 Claims, 22 Drawing Sheets

(58) Field of Classification Search
CPC ........ G06F 1/1677; G06F 1/16; G06F 3/0483; G06F 3/0484; G06F 3/0486; G06F 3/14; H04M 1/0235; H04M 1/0245
See application file for complete search history.

(56) References Cited

U.S. PATENT DOCUMENTS

| | | |
|---|---|---|
| 8,907,977 B2 | 12/2014 | Roth et al. |
| 8,988,353 B2 | 3/2015 | Shin et al. |
| 9,041,648 B2 | 5/2015 | Lee et al. |
| D770,504 S | 11/2016 | Kim et al. |
| 9,772,749 B2 | 9/2017 | Chaudhri et al. |
| 9,898,164 B2 | 2/2018 | Kang et al. |
| 10,025,458 B2 | 7/2018 | Chaudhri et al. |
| 10,025,480 B2 | 7/2018 | Shin et al. |
| 10,168,868 B2 | 1/2019 | Lee et al. |
| 10,379,720 B2 | 8/2019 | Ryu et al. |
| 10,424,272 B2 | 9/2019 | Yoon et al. |
| 10,488,947 B2 | 11/2019 | Kwon et al. |
| 10,497,336 B2 | 12/2019 | Lee et al. |
| 10,915,235 B2 | 2/2021 | Shin et al. |
| 10,990,208 B2 | 4/2021 | Jung et al. |
| 11,057,514 B1 * | 7/2021 | Noh ...................... G06F 1/1643 |
| 11,150,742 B2 | 10/2021 | Kwon et al. |
| 11,216,158 B2 | 1/2022 | Lee et al. |
| 11,449,119 B2 | 9/2022 | Jung et al. |
| 11,500,516 B2 | 11/2022 | Chaudhri et al. |
| 11,507,250 B2 | 11/2022 | Kim et al. |
| 2010/0222113 A1 | 9/2010 | Anzai |
| 2012/0166987 A1 | 6/2012 | Kang et al. |
| 2012/0169768 A1 | 7/2012 | Roth et al. |
| 2012/0180001 A1 | 7/2012 | Griffin et al. |
| 2013/0300697 A1 | 11/2013 | Kim et al. |
| 2014/0340299 A1 * | 11/2014 | Lee ......................... G06F 3/147 |
| | | 345/156 |
| 2015/0026616 A1 * | 1/2015 | Litan Sever .......... G06F 3/0486 |
| | | 715/765 |
| 2015/0242006 A1 | 8/2015 | Kim et al. |
| 2016/0042004 A1 * | 2/2016 | Kawamoto ........... G06F 3/1454 |
| | | 715/739 |
| 2016/0139776 A1 * | 5/2016 | Donahue ................. G06F 9/543 |
| | | 715/781 |
| 2016/0147362 A1 * | 5/2016 | Eim ....................... G06F 3/0416 |
| | | 345/173 |
| 2016/0335980 A1 | 11/2016 | Lee et al. |
| 2016/0349971 A1 * | 12/2016 | Chi ......................... G09G 5/373 |
| 2017/0147189 A1 * | 5/2017 | Ryu .................... G06F 3/04886 |
| 2017/0154609 A1 | 6/2017 | Yoon et al. |
| 2018/0267642 A1 * | 9/2018 | Kim ...................... G06F 3/0482 |
| 2019/0042066 A1 * | 2/2019 | Kim ...................... H04M 1/725 |
| 2019/0261519 A1 * | 8/2019 | Park ................... H04M 1/0235 |
| 2020/0379615 A1 | 12/2020 | Chaudhri et al. |
| 2022/0121346 A1 | 4/2022 | Kim et al. |

FOREIGN PATENT DOCUMENTS

| | | |
|---|---|---|
| KR | 20120075183 A | 7/2012 |
| KR | 20120079271 A | 7/2012 |
| KR | 20130127050 A | 11/2013 |
| KR | 20140098904 A | 8/2014 |
| KR | 20140135404 A | 11/2014 |
| KR | 20150081657 A | 7/2015 |
| KR | 20160139320 A | 12/2016 |
| KR | 20160150533 A | 12/2016 |
| KR | 20170059815 A | 5/2017 |
| KR | 20170060519 A | 6/2017 |
| KR | 20180065692 A | 6/2018 |
| KR | 20190128843 A | 11/2019 |
| KR | 102254597 B1 | 5/2021 |
| WO | 2021121121 A1 | 6/2021 |

OTHER PUBLICATIONS

Extended European Search Report dated Oct. 21, 2024, in EP Application No. 22881188.1.
Korean Office Action corresponding to Application No. 10-2021-0135171; Dated Oct. 27, 2025.

* cited by examiner

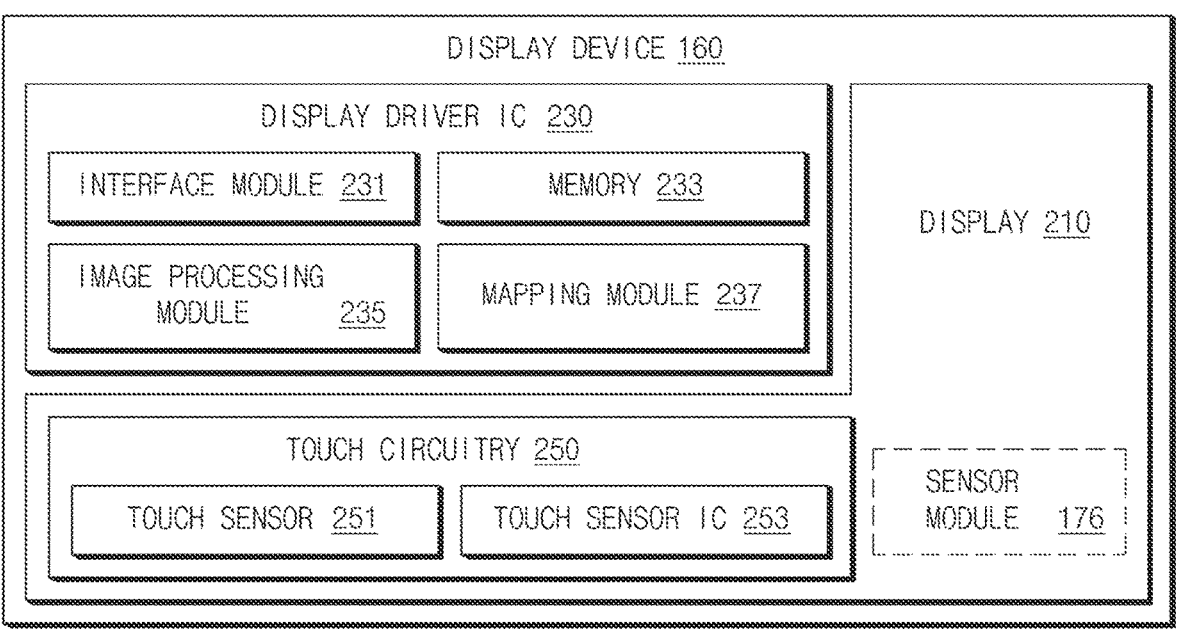
FIG.2

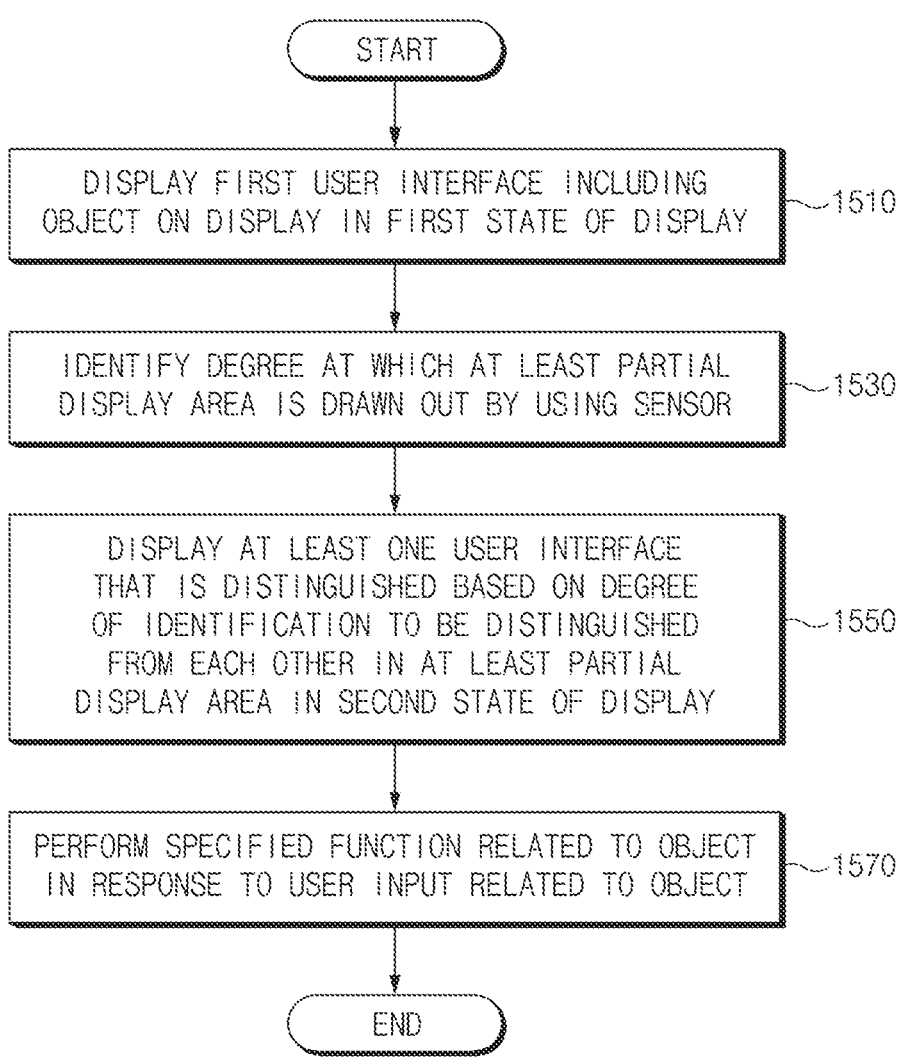

START

DISPLAY FIRST USER INTERFACE INCLUDING
OBJECT ON DISPLAY IN FIRST STATE OF DISPLAY — 1510

IDENTIFY DEGREE AT WHICH AT LEAST PARTIAL
DISPLAY AREA IS DRAWN OUT BY USING SENSOR — 1530

DISPLAY AT LEAST ONE USER INTERFACE
THAT IS DISTINGUISHED BASED ON DEGREE
OF IDENTIFICATION TO BE DISTINGUISHED — 1550
FROM EACH OTHER IN AT LEAST PARTIAL
DISPLAY AREA IN SECOND STATE OF DISPLAY

PERFORM SPECIFIED FUNCTION RELATED TO OBJECT
IN RESPONSE TO USER INPUT RELATED TO OBJECT — 1570

END

FIG.15

ELECTRONIC DEVICE AND OPERATION METHOD THEREOF

CROSS-REFERENCE TO RELATED APPLICATIONS

This application is a continuation of International Application No. PCT/KR2022/012426, designating the United States, filed on Aug. 19, 2022, in the Korean Intellectual Property Receiving Office and claiming priority to Korean Patent Application No. 10-2021-0135171, filed on Oct. 12, 2021, in the Korean Intellectual Property Office, the disclosures of all of which are incorporated by reference herein in their entireties.

BACKGROUND

1. Field

Various embodiments disclosed in the disclosure relate to an electronic device and an operation method thereof.

2. Description of the Related Art

An electronic device may have various form factors. The structure of a display may also be variously changed according to the form factor of an electronic device. For example, an electronic device can have a form factor in which the size of a display changes, such as a slideable device, a foldable device, a rollable device, or a multi-foldable device.

SUMMARY

In a display in which the display area can be reduced or enlarged, it may be difficult to improve user convenience by simply changing the magnification of the screen.

Various embodiments of the disclosure provide an electronic device that performs a specified function corresponding to the size of an expanded display area when the display area of a display is enlarged.

According to one embodiment of the disclosure, an electronic device includes a housing, a display including a flexible display having a first state in which at least a portion of a display area is drawn into the housing and a second state in which the at least a portion of the display area is drawn out of the housing as the flexible display is deformed or moved, a sensor, a memory, and a processor operatively coupled to the display, the sensor and the memory. According to an embodiment, the memory may store one or more instructions which, when executed, cause the processor to display a first user interface including an object on the display when the display is in the first state, identify a degree at which the at least a portion of the display area of the display is drawn out of the housing by using the sensor, display at least one user interface that is distinguished from the first user interface based on the identified degree in the at least a portion of the display area so as to be distinguished from each other when the display is in the second state, and perform a specified function related to the object in response to a user input related to the object.

In addition, according to another embodiment of the disclosure, a method of operating an electronic device which includes a display including a flexible display having a first state in which at least a portion of a display area is drawn into a housing and a second state in which the at least a portion of the display area is drawn out of the housing, includes displaying a first user interface including an object on the display when the display is in the first state, identifying a degree at which the at least a portion of the display area of the display is drawn out of the housing by using a sensor, displaying at least one user interface that is distinguished from the first user interface based on the identified degree in the at least a portion of the display area so as to be distinguished from each other when the display is in the second state, and performing a specified function related to the object in response to a user input related to the object.

In addition, according to still another embodiment of the disclosure, a method of operating an electronic device, which includes a display including a flexible display having a first state in which at least a portion of a display area is drawn into a housing and a second state in which the at least a portion of the display area is drawn out of the housing, includes displaying a fast user interface including an object on the display when the display is in the first state, determining whether the electronic device is in a specified mode for editing an item displayed on the display, changing the display to the second state based on that the electronic device is in the specified mode, identifying a degree at which a display area of the display is drawn out of the housing when the display is in the second state, and displaying at least one user interface that is distinguished from the first user interface based on the identified degree on at least a portion of the display area of the display in the second state to be distinguished from each other.

Various embodiments of the disclosure provide an electronic device that performs a specified function corresponding to the size of an expanded display area when the display area of a display is enlarged.

In addition, various effects that are directly or indirectly understood through the disclosure may be provided.

BRIEF DESCRIPTION OF DRAWINGS

FIG. 2 is a block diagram illustrating a display module according to an embodiment.

FIG. 15 is a flowchart illustrating a method of operating an electronic device according to various embodiments.

With regard to description of drawings, the same or similar elements may be marked by the same or similar reference numerals.

DETAILED DESCRIPTION

Figure 1:
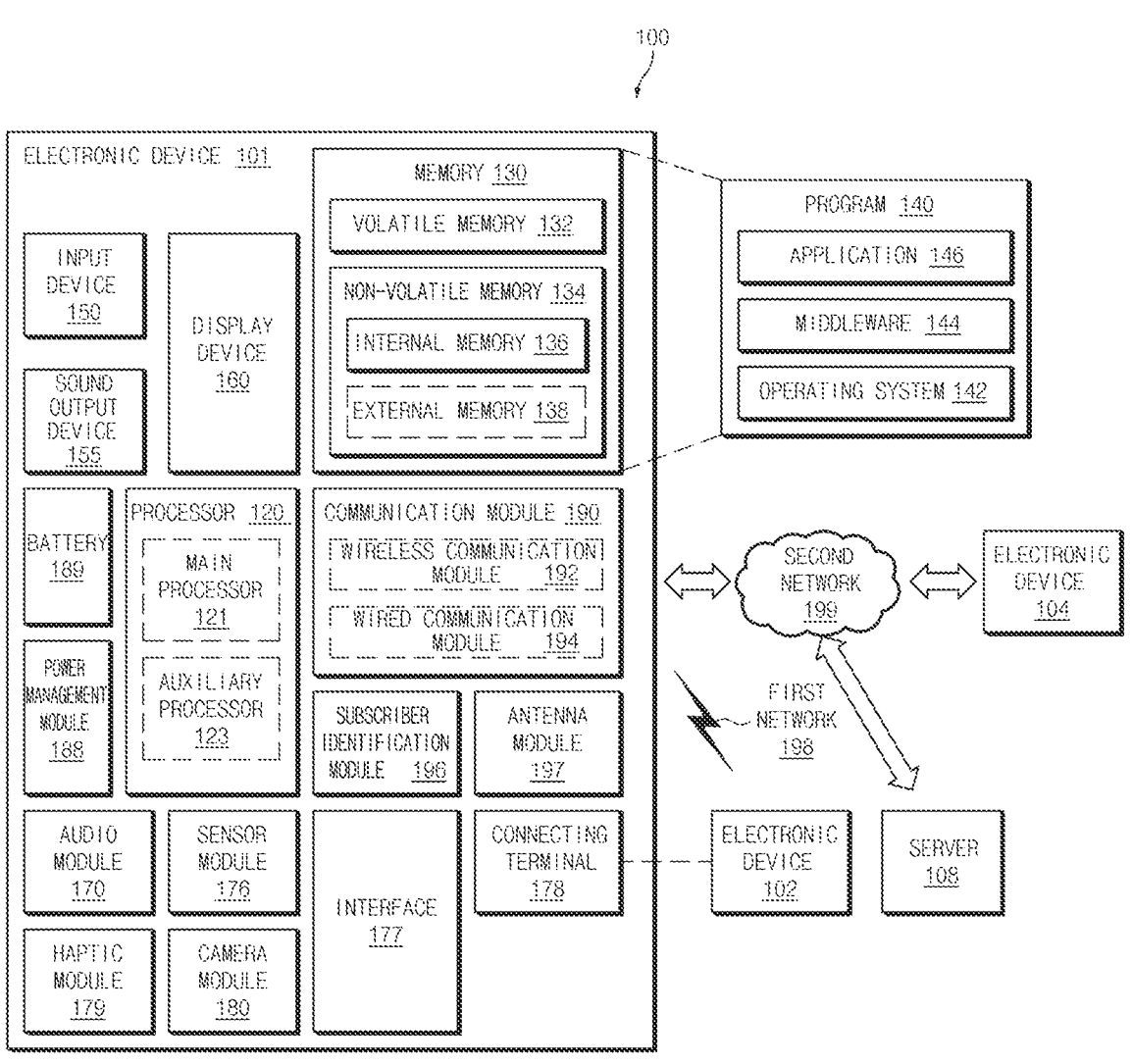
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram 200 illustrating the display module 160 according to various embodiments. Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDT 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDT 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
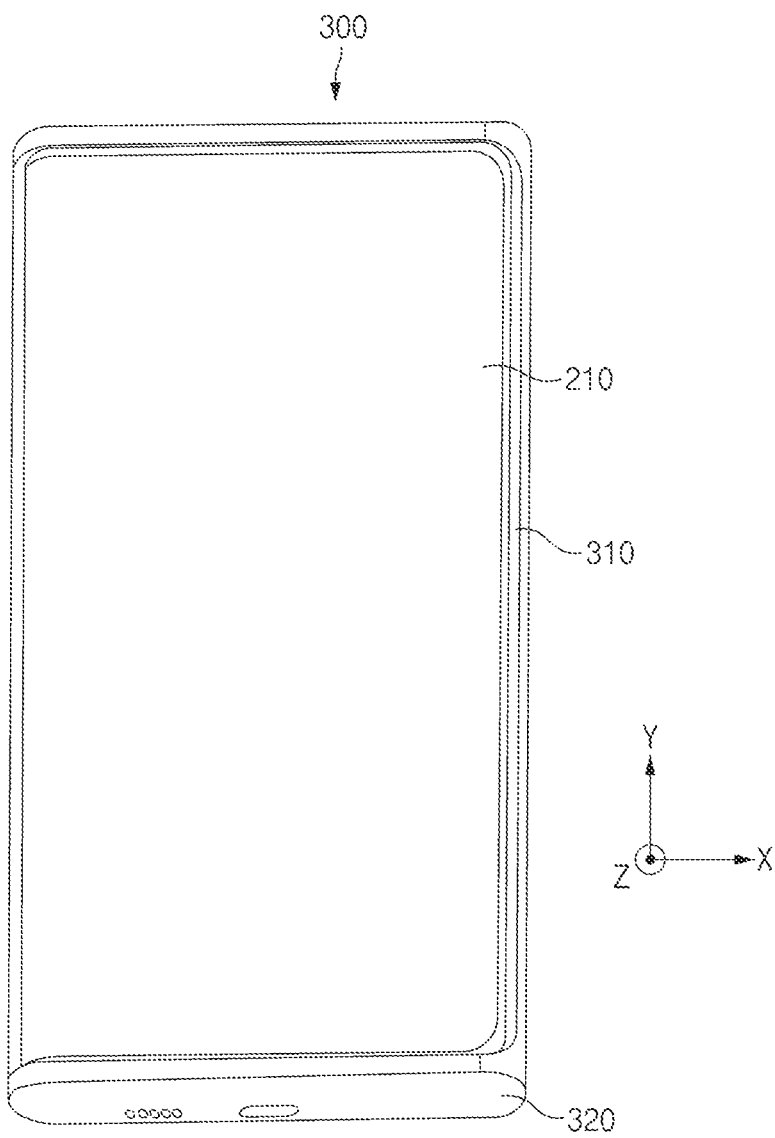
FIG. 3A is a front view illustrating a normal mode of a display of an electronic device according to an embodiment.

FIG. 3A is a front view 300 illustrating a normal mode of a display of an electronic device according to various embodiments. In an embodiment, an electronic device (e.g., the electronic device 101 of FIG. 1) may include the display 210 (e.g., at least a portion of the display module 160 of FIG. 1 and/or FIG. 2).

In various embodiments, the display 210 may be implemented in a manner such as a liquid crystal display (LCD), an organic light emitting display (OLED), a quantum dot (QD), or a micro light emitting diode (LED). The display 210 may have a flexible shape. The flexible display 210 may be folded or rolled so that at least some areas (or display areas) are curved. For example, at least a portion of the display 210 may be foldable. For example, at least a portion of the display 210 may be rollable.

In various embodiments, the electronic device may include a driving unit (not shown) and/or a rotating unit (not shown). The display 210 may be manually and/or automatically slid by the mechanical driving of the driving unit and/or the rotating unit.

According to an embodiment, the driving unit may move at least a portion of the display 210 to the inside and/or the outside of the electronic device. The driving unit may control to switch to a normal mode in which the display 210 is mounted (or retracted) to the inside of the electronic device and an expanded mode in which the display 210 extends (or is drawn out) to the outside of the electronic device. The driving unit may have a slide-type rail structure and/or a motor which is arranged inside the electronic device, but this is only an example and is not limited to interpretation. The rotating unit may move the display 210 into and/or out of the electronic device or may serve as a support for supporting the display 210 when the display 210 moves into and/or out of the electronic device. The rotating unit may insert the rollable display 210 to the inside of the electronic device 101 while allowing rollable display 210 to be rolled or may extend the rollable display 210 to the outside of the electronic device 101 while unfolding the display 210. The rotating unit may be a cylinder-shaped rotating body arranged on a side of the electronic device, but the embodiment is not limited thereto.

According to an embodiment, the operation of the driving unit may be triggered based on a user input. According to an embodiment, the user input for triggering the operation of a driving mechanism may include a touch input, a force touch input, and/or a gesture input through the display module 160. For example, when signals are generated from various sensors such as a pressure sensor of the sensor module 176, the electronic device 101 may switch from a first state (e.g., a normal mode) to a second state (e.g., an expanded mode) or from the second state to the first state. In another embodiment, the user input for triggering the driving unit may include a voice input (speech input) or an input of a physical button visually exposed to the outside of housings 310 and 320.

According to an embodiment, the electronic device 101 may perform the operation of the driving unit based on activation of a specified mode. For example, the electronic device 101 changes the state of the display from the first state to the second state or from the second state to the first state based on the activation of an editing mode for editing an item (e.g., an image and/or an icon) displayed through the display 210. For example, the editing mode may include a mode for performing an operation specified by a user input on the user interface shown in FIGS. 7A to 15, but the embodiment is not limited thereto.

According to an embodiment, the normal mode may be a mode in which at least a portion of the display 210 is accommodated (or drawn in) into an electronic device by the driving unit and/or rotating unit described above. In an embodiment, the display 210 in the normal mode may correspond to the display 210 in the first state.

According to an embodiment (not shown), the display 210 of the electronic device 101 may include at least one sensor module (e.g., sensor module 176) and/or a camera module (e.g., camera module 180) in a second direction (e.g., −Z direction). For example, the at least one sensor module may not be visually exposed through the display 210, and may include a fingerprint sensor for obtaining fingerprint information of a user. For example, as a scheme of operating the fingerprint sensor, at least one of an electrostatic type, an optical type, a pressure sensitive type, or an ultrasonic type may be used, and a plurality of fingerprint sensors using a plurality of schemes may be arranged. In addition, the at least one camera module may not be visually exposed through the display 210, and may include an under-display camera. In an embodiment, the electronic device 101 may include a plurality of camera modules for providing different angles of view, and a user interface distinguished from a surrounding area may be provided on an area (or location) in which the plurality of camera modules overlaps the display 210 at least partially in the first direction.

According to an embodiment, the display 210 of the electronic device 101 may be faced in a first direction (+Z-axis direction) that is a front side. The user may recognize the screen of the display 210 from the front side of the electronic device.

According to an embodiment, the first housing 310 may form a side surface of the electronic device 101. The first housing 310 may protect the side surface of the display 210. The first housing 310 may include an opening formed in the side surface thereof.

According to an embodiment, the second housing 320 may form upper and lower outer edges of the electronic device 101. The second housing 320 may protect upper and lower portions of the display 210. A connector terminal, a microphone hole, a speaker hole, and a sensor hole may be arranged in the second housing 320.

Figure 3B:
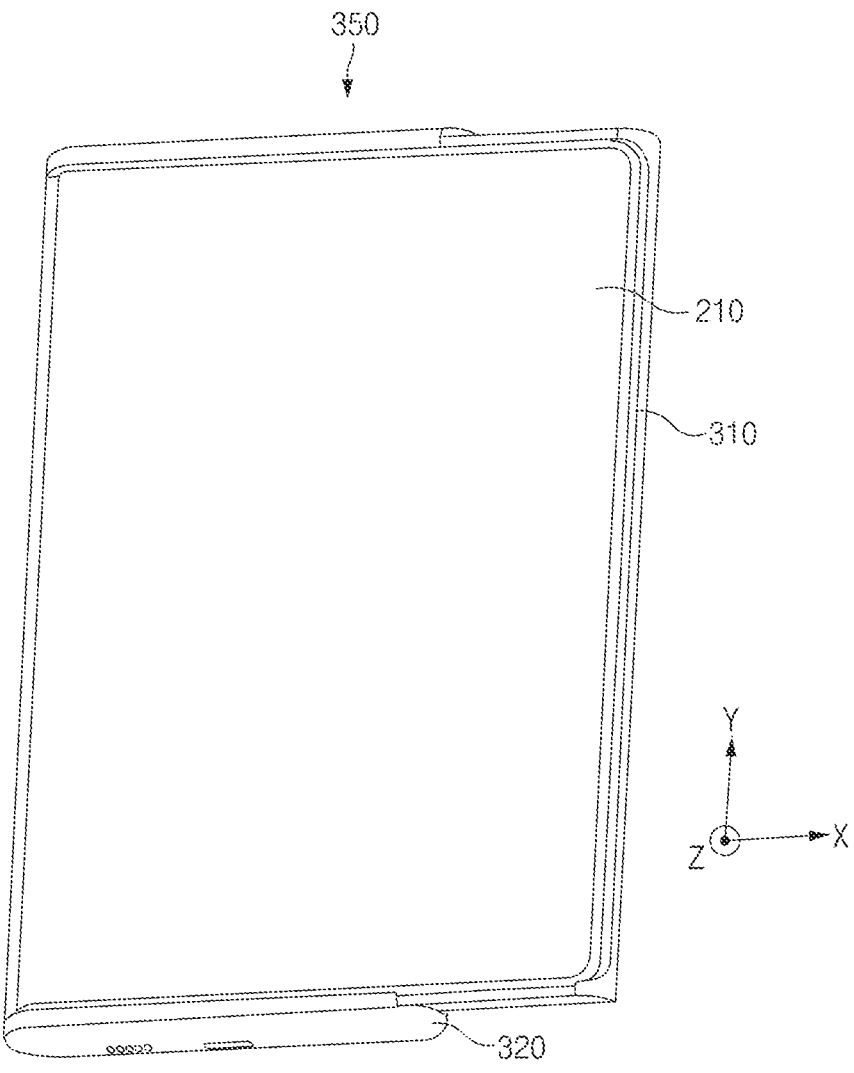
FIG. 3B is a front view illustrating an expanded mode of a display of an electronic device according to an embodiment.

FIG. 3B is a front view 350 illustrating an expanded mode of a display of an electronic device according to various embodiments of the disclosure.

The expanded mode according to an embodiment may be an expanded mode which is implemented by extending the display module 160 described with reference to FIG. 1. For example, the expanded mode may be a mode in which the display 210 (e.g., at least a portion of the display module 160 of FIGS. 1 and/or 2) extends (or is withdrawn) to the outside of the electronic device by the above-described driving unit (not shown) and/or rotating unit (not shown). According to an embodiment, the expanded mode may be a mode in which at least a portion of the display 210 is exposed to the outside of the electronic device by the driving unit and/or rotating unit described above. In an embodiment, in the expanded mode, the display 210 may correspond to the display 210 in the second state.

According to an embodiment, the display 210 may extend toward a side (e.g., in +X-axis direction) of the electronic device 101. In the normal mode before being expanded, the display 210 may be arranged in a bent or rolled state inside the first housing 310 and the second housing 320 in the opposite direction to the extending direction. The display 210 may extend to the outside of the electronic device 101. For example, the display 210 may extend while unfolding or sliding inside the first housing 310 and the second housing 320, so that at least a partial area thereof may protrude from the inside of the electronic device 101 via an opening formed in the side surface of the first housing 310. Accordingly, the size of the display 210 recognized by the user may increase. Compared to the normal mode of the display 210, the size of the display 210 may increase by an additional display area in the expanded mode of the display 210.

According to an embodiment, a mode (e.g., the normal mode, and/or the expanded mode) or a state (e.g., the first state or the second state) of the electronic device 101 is not limited to those illustrated, and may include a free stop mode or an intermediate mode (or intermediate state). For example, the free stop mode may include a state between a state in which the display 210 is in a minimally retracted state and a state in which the display 210 is in a fully expanded state, and based on a user input, may include a first intermediate mode (e.g., a first sub-state 720 in FIGS. 7A and 7B) and a second intermediate mode (e.g., a second sub-state 730 in FIGS. 7A and 7B). For example, the plurality of intermediate modes (free stop modes) may be set corresponding to the number of pages of a home screen described below (e.g., first to fourth pages in FIG. 7B).

According to an embodiment, an area in which the display 210 extends may be determined by a user setting and/or a user interface in the intermediate mode among the modes (e.g., the normal mode, the intermediate mode, and/or the expanded mode) of the electronic device 101. For example, the electronic device 101 may designate the number of areas expanded by the user, and the display 210 may expanded to display the designated areas (e.g., second areas 721, 731 and 741 of FIGS. 7A and 7B) regardless of the function. As another example, the electronic device 101 may determine the number of areas to be expanded based on a user interface that is displayed on the display 210 and obtains a user input. For example, the first user interface may be expanded to the first sub-area (e.g., the first sub-area 721 of FIGS. 7A and 7B), and the second user interface may be expanded to the first sub-area 721 and the second sub-area (e.g., the second sub-area 731 of FIGS. 7A and 7B).

Although described as a user interface in the disclosure, the user interfaces are different according to the function executed in the electronic device 101, so that the area expanded based on the executed function or application may be changed.

According to an embodiment, the first housing 310 may protect the side surface of the expanded display 210. The second housing 320 may fix the upper and lower portions of the display 210 to prevent the expanded display 210 from being separated from the electronic device 101.

According to an embodiment, the form in which the electronic device 101 expands or reduces the display 210 is not limited to the illustrated form. For example, the electronic device 101 may be variously formed such as a book cover type in which the rotating unit supporting and rotating the display 210 moves according to a state change, an alpha type in which a connector terminal, a microphone hole, a speaker hole, and/or a sensor hole are hidden or displayed according to a state change, and/or a drawer type that includes at least some camera modules of the first housing 310 and in which moves the camera module according to a state change.

Figure 4A:
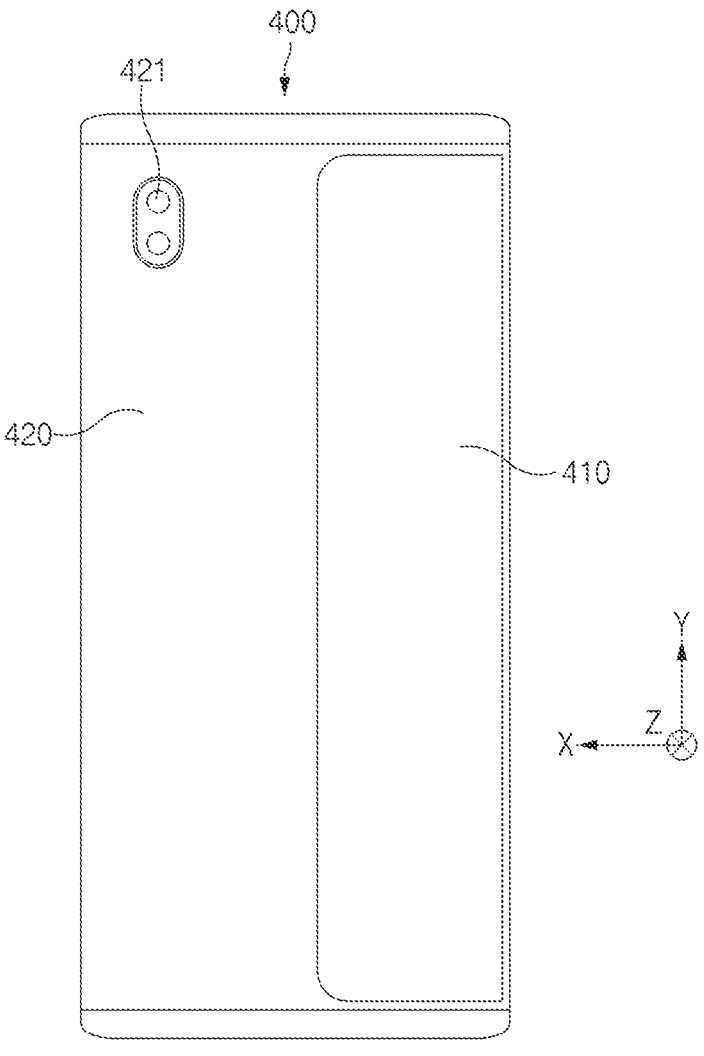
FIG. 4A is a rear view illustrating a normal mode of a display of an electronic device according to an embodiment.
Figure 4B:
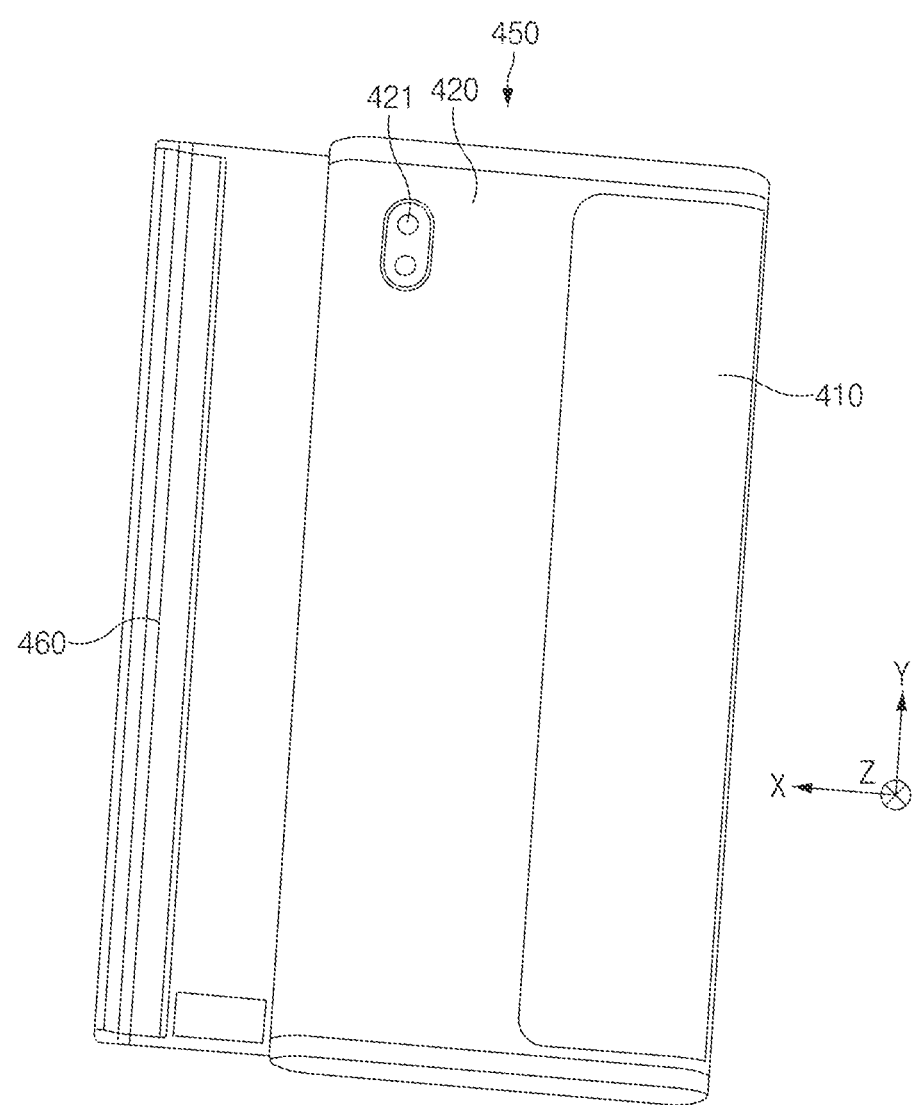
FIG. 4B is a rear view illustrating an expanded mode of a display of an electronic device according to an embodiment.

FIG. 4A is a rear view 400 illustrating a normal mode of a display of an electronic device according to various embodiments. Referring to FIG. 4A, the electronic device (e.g., the electronic device 101 of FIG. 1) displays a display (e.g., at least a portion of the display module 160 of FIGS. 1 and/or 2 or the display 210 of FIG. 3A) in the normal mode. FIG. 4B is a rear view 450 illustrating an expanded mode of a display of an electronic device according to various embodiments. Referring to FIG. 4B, the electronic device displays a display (e.g., at least a portion of the display module 160 of FIGS. 1 and/or 2 or the display 210 of FIG. 3B) in the expanded mode.

According to an embodiment, the electronic device may have a sub-display 410, a third housing 420, and a camera hole 421 to be faced in the second direction (Z-axis direction) which is the rear side thereof. The sub-display 410 may display contents different from the screen displayed by the display (e.g., the display 210 of FIG. 3A). The third housing 420 may protect the rear surface of the electronic device. The camera hole 421 may photograph an outside.

According to an embodiment, the display 210 may extend in a third direction (e.g., X-axis direction) substantially perpendicular to the first and second directions to have a larger size than the third housing 420. In order to protect the rear edge of the expanded display 210, a protection member 460 may be arranged on the rear surface of the display 210.

According to an embodiment, the sub-display 410 may be formed as an independent display or may be formed as at least a portion of the display 210. For example, when the sub-display 410 is formed independently of the display 210, a plurality of display driver ICs for controlling the sub-display 410 and the display 210 may be formed to control each display. As another example, when the display 210 is in the first state (e.g., a normal mode), the sub-display 410 may cause at least a portion (e.g., a second area 520 of FIGS. 5A and 5B) of the display 210 inserted into at least a portion of the housing 320 to operate as the sub-display 410.

Figure 5A:
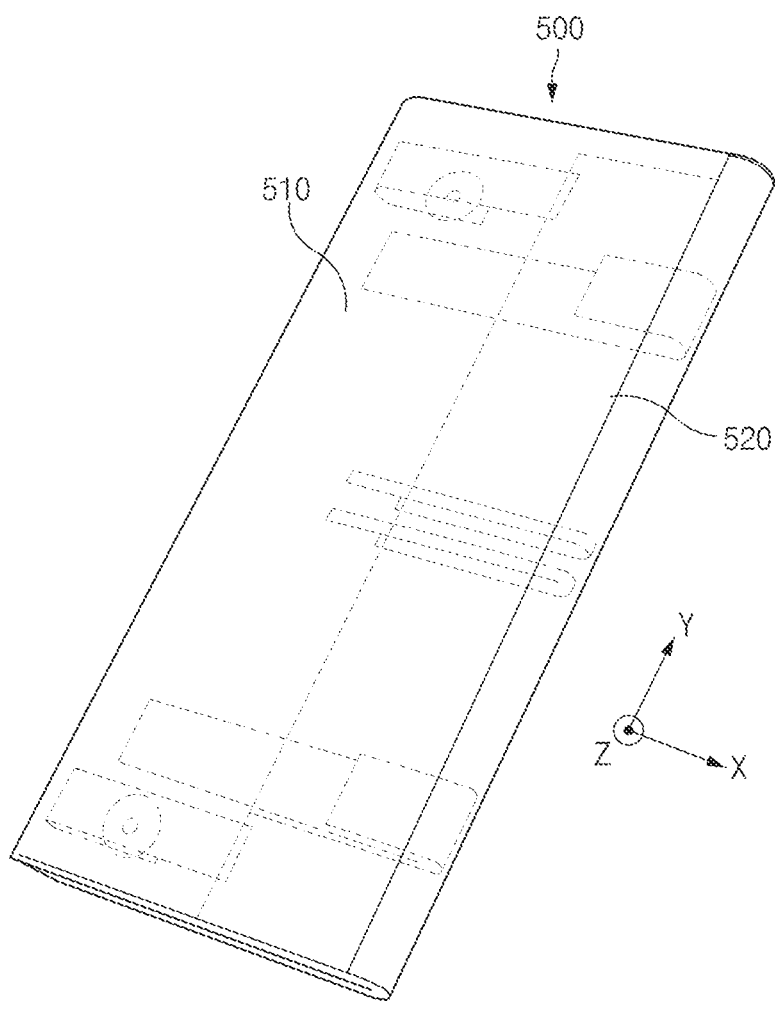
FIG. 5A is a perspective view illustrating a normal mode of a display of an electronic device according to an embodiment.
Figure 5B:
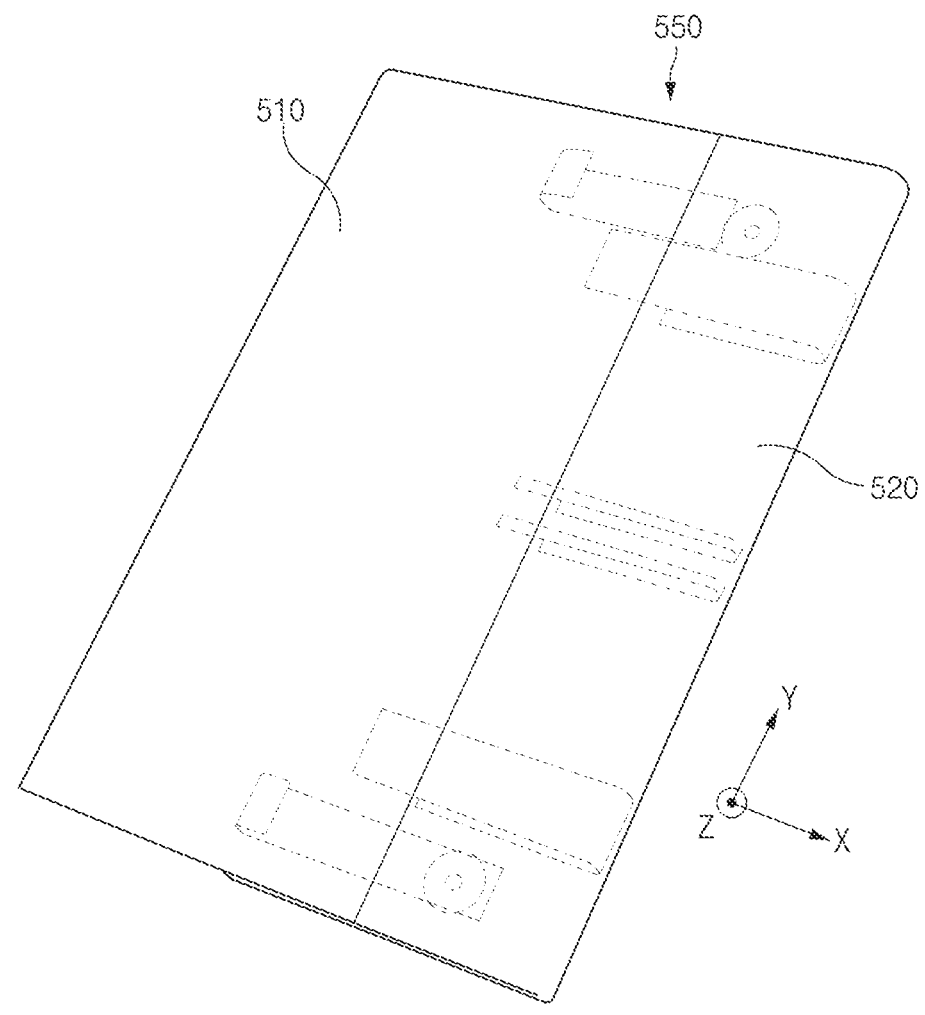
FIG. 5B is a perspective view illustrating an expanded mode of a display of an electronic device according to an embodiment.

FIG. 5A is a perspective view 500 illustrating a normal mode (e.g., a first state) of a display of an electronic device according to various embodiments. Referring to FIG. 5A, an electronic device (e.g., the electronic device 101 of FIG. 1)

may display a display (e.g., at least a portion of the display module 160 of FIGS. 1 and/or 2 or the display 210 of FIG. 3A) in the normal mode. FIG. 5B is a perspective view 550 illustrating an expanded mode of a display of an electronic device according to various embodiments. Referring to FIG. 5B, the electronic device may display a display (e.g., at least a portion of the display module 160 of FIGS. 1 and/or 2 or the display 210 of FIG. 3B) in the expanded mode.

According to an embodiment, the display 210 may include a first area 510 and the second area 520. The first area 510 and the second area 520 may display one screen including continuous contents that are connected to each other at at least one boundary. In various examples, the first area 510 and the second area 520 may display contents different from each other. In an embodiment, the first area 510 of the display 210 may extend in a lateral direction of the electronic device. For example, as the length of the first area 510 in the third direction (X-axis direction) increases, the area of the first area 510 may increase.

According to an embodiment, the second area 520 of the display 210 may be embedded (or inserted) in a portion of the electronic device. The second area 520 may extend (or be drawn out) to appear outside (e.g., in the third direction) of the electronic device in the expanded mode.

According to an embodiment (not shown), the display 210 may extend in a fourth direction (e.g., a Y-axis direction) substantially perpendicular to the first direction and the second direction. In addition, according to an embodiment, the display 210 may include a driving unit and an extending unit that can extend in the third direction (e.g., X-axis direction) and a fifth direction (e.g., Y-axis direction), respectively. For example, the electronic device 101 may extend the display 210 in the third direction in the first user interface (e.g., the user interface of FIG. 7), and may extend the display 210 in the fifth direction in the second user interface (e.g., the user interface of FIG. 14).

In an embodiment, the display 210 may extend in both directions. For example, the display 210 may extend in the third direction (e.g., X-axis direction) and the fourth direction (e.g., −X-axis direction) substantially perpendicular to the first direction and the second direction to have a size larger than that of the third housing 420. For example, the electronic device 101 may expand simultaneously/sequentially in the third direction and the fourth direction. As another example, the electronic device 101 may expand in both directions or in one direction based on the size of the user interface required for a provided function (or, an application or service).

In an embodiment, the electronic device 101 may determine the direction in which the display 210 is expanded based on the position of the display 210 in which the user input is confirmed. For example, when viewed from the first direction (e.g., the Z-axis direction), when a user input is generated on the right side with respect to the center of the display 210, the electronic device 101 may expand the display 210 in the third direction (e.g., X-axis direction), and when the user input is generated on the left side with respect to the center of the display 210, the electronic device 101 may expand the display 210 in the fourth direction (e.g., −X-axis direction).

As an embodiment, although described as an expanding operation of the electronic device 101, those skilled in the art will understand that this is only for easy understanding, and the same content is applied in a reduced state as well as an expanded state of the display 210.

Figure 6A:
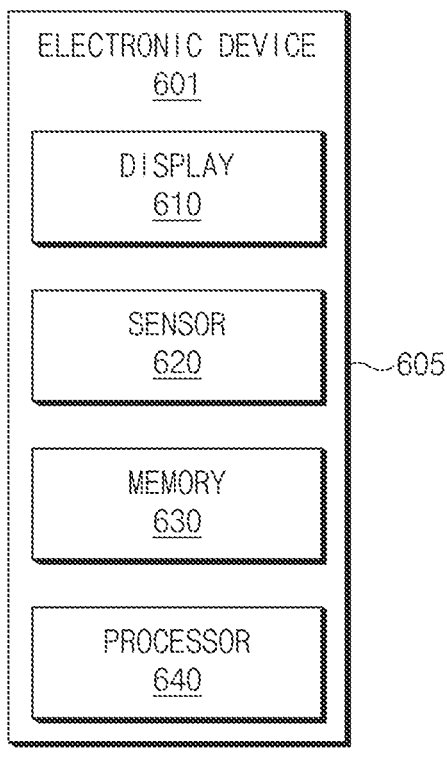
FIG. 6A is a block diagram illustrating an electronic device according to various embodiments.

FIG. 6A is a block diagram illustrating an electronic device according to various embodiments.

According to an embodiment, an electronic device 601 (e.g., the electronic device 101 of FIG. 1) may include a housing 605 (e.g., at least one of the first housing 310 and the second housing 320 of FIGS. 3A to 3B, or the third housing 420 of FIGS. 4A and 4B), a display 610 (e.g., the display module 160 of FIG. 1, the display 210 of FIGS. 2, 3A and 3B, or the display 210 of FIGS. 5A and 5B), a sensor 620 (e.g., the sensor module 176 of FIGS. 1 and 2), a memory 630 (e.g., the memory 130 of FIG. 1), and a processor 640 (e.g., the processor 120 of FIG. 1).

According to an embodiment, the housing 605 may surround at least some of the components included in the electronic device 601 and define the outer appearance of the electronic device 601. According to an embodiment, the housing 605 may surround at least some of the components of the electronic device 601 as an integral structure or as two or more divided structures.

According to an embodiment, the housing 605 may be movable such that the shape of the display 610 may be deformed. In various examples, the housing 605 may be implemented to be movable such that at least a portion of the display 610 is folded (e.g., foldable or bendable). In another example, the housing 605 may be movable such that at least a portion of the display 610 is wound (e.g., rollable).

According to an embodiment, the display 610 may be a flexible display in which at least a portion of the display area may be bent or rolled. Hereinafter, the display 610 may correspond to a flexible display.

According to an embodiment, the display 610 may be in the first state (e.g., the normal mode) in which at least a portion of the display area is retracted (or accommodated) in the housing 605 of the electronic device 601. In various embodiments, the display 610 may be in the first state in which at least a portion of the display area is withdrawn (e.g., folded, bent, or rolled) from the outside of the housing 605 of the electronic device 601.

According to an embodiment, the state of the display 610 may be changed from the first state to the second state (e.g., an expanded or exposed mode) or may be changed from the second state to the first state. In this case, among the display areas of the display 610 in the first state, the area that is not exposed to the outside of the electronic device 601 (e.g., the second area 520 of FIGS. 5A and 5B) may be exposed in front of the electronic device 601 when the display 610 changes to the second state. The user of the electronic device 601 may visually recognize an additional display area (e.g., the second area 520 of FIGS. 5A and 5B') as the display 610 changes from the first state to the second state. In the second state, the display 610 may display a relatively larger amount of content than the amount of content displayed by the display 610 in the first state. In various examples, in the second state, the display 610 may display contents, which are different from the contents displayed on the display 610 in the first state, in the additional display area.

Hereinafter, the first area (e.g., the first area 510 of FIGS. 5A to 5B) of the display 610 may correspond to a display area exposed to the outside of the housing 605 (or the electronic device 601) when the display 610 is in the first state. The second area (e.g., the second area 520 of FIGS. 5A and 5B) of the display 610 may correspond to an display area which is not exposed to the outside of the housing 605 when the display 610 is in the first state, and which is exposed to the outside of the housing 605 when the display 610 is in the second state.

According to an embodiment, the sensor 620 may detect (or sense) the first state in which at least a portion of a display area of the display 610 is drawn into the housing 605, or the second state in which the at least a portion of the display area is drawn out of the housing 605. According to an embodiment, in the second state, the sensor 620 may detect a degree (or a degree of extent) at which the display area of the display 610 is drawn out of the housing 605. For example, in the second state, the sensor 620 may detect the size (or length) of the display area of the display 610 drawn out of the housing 605. In various embodiments, the sensor 620 may detect the size of the display area of the display 610 drawn out of the housing 605 based on a characteristic value that changes as the shape of the display 610 changes or the display 610 moves.

According to an embodiment, the sensor 620 may detect a degree at which the display area of the display 610 is drawn out of the housing 605 based on a capacitance. The sensor 620 may detect the capacitance that changes as the display area of the display 610 is drawn into or out of the housing 605. The sensor 620 may detect a degree at which the display area of the display 610 is drawn out of the housing 605 based on the detected capacitance change. In an embodiment, the sensor 620 may use a conductive member (not shown) to recognize a coordinate value on the display 610 in which capacitance is changed, thereby detecting a degree at which the display area of the display 610 is drawn out of the housing 605. In an embodiment, the sensor 620 may use a plurality of conductive members (not shown) to recognize that capacitance is changed as the plurality of conductive members overlap. The sensor 620 may detect a degree at which the display area of the display 610 is drawn out of the housing 605 by detecting an amount of change in capacitance according to an overlapping area of the plurality of conductive members.

According to an embodiment, the sensor 620 may use a light source to detect a degree at which the display area of the display 610 is drawn out of the housing 605. The sensor 620 may identify a time of flight (TOF) based on a time (or phase difference) at which light emitted from the light source is reflected by a surrounding structure and returns. The sensor 520 may detect a degree at which the display area of the display 610 is drawn out of the housing 605 based on the identified TOF. According to another embodiment, the sensor 620 may detect the degree of withdrawal to the outside based on a measured amount of light emitted from the light source. For example, the sensor 520 may detect a degree at which the display area of the display 610 is drawn out of the housing 605, based on whether the amount of measured light is large or small.

According to an embodiment, the sensor 620 may use magnetic force to detect a degree at which the display area of the display 610 is drawn out of the housing 605. For example, the sensor 620 may include a hall sensor or a magnetic (geomagnetic) sensor that detects a magnetic force. For example, the hall sensor or the magnetic (geomagnetic) sensor may include a transmitter for generating a magnetic field of a specified frequency and a receiver for receiving the magnetic field generated from the transmitter, and may obtain a state change of the electronic device 601. For example, the magnetic (geomagnetic) sensor may measure the orientation by using a magnetic field and a magnetic field line, and the hall sensor may sense the intensity of the magnetic field to obtain a state change of the electronic device 601. The hall sensor may be located at a fixed location inside the electronic device 601, and at least one magnet may be located at every specified distance on the display 610 (or a surrounding structure of the display 610). The hall sensor may detect a degree at which the display area of the display 610 is drawn out by detecting a magnetic force that is changed as at least a portion of the display area of the display 610 slides and is drawn out of the housing 605. In another example, the hall sensor may detect a magnetic force that is changed as at least a portion of the display area of the display 610 is rolled and drawn out of the housing 605. According to another embodiment, the sensor 620 may detect a magnetic field generated from an electromagnetic inductor (e.g., an input device) by using an electromagnetic wave, and detect various motions such as approach or movement of the electromagnetic inductor.

According to an embodiment, the sensor 620 may include a rotary sensor. For example, the rotary sensor may detect whether a rotation shaft (or an actuator) that faces a part of the display 610 is rotated. For example, the rotary sensor may detect the rotation direction and/or the number of rotations of the rotation shaft. The electronic device 601 may obtain a display state change through the rotary sensor, and the rotation shaft may constitute at least a portion of the rotating unit.

According to an embodiment, the sensor 620 may use the resistance value to detect a degree at which the display area of the display 610 is drawn out of the housing 605. For example, a wire may be arranged on the display 610 (or a surrounding structure of the display 610). As the display area of the display 610 is drawn out of the housing 605, the length of the wire may be changed. The sensor 620 may detect a change in the resistance value according to the length of the wire. The sensor 620 may detect a degree at which the display area of the display 610 is drawn out of the housing 605 based on the detected resistance value. For example, the sensor 620 may include a stretch sensor and arranged inside the housing 605 of the electronic device 601 in the first direction (e.g., X-axis direction) of the electronic device 601 and may be stretchable according to the state change of the electronic device 601. For example, the stretch sensor may recognize a change in the length of a pattern (metal pattern) as the resistance change, and obtain a state change of the electronic device 601 based on the changed resistance value. As another example, the sensor 620 may detect a change in the resistance value based on external pressure generated on the surface. For example, the resistance value inside the electronic device may be changed due to an external pressure, and the sensor 620 may detect a degree at which the display 610 is drawn out based on the changed resistance value.

According to an embodiment, the sensor 620 may use inductance to detect a degree at which the display area of the display 610 is drawn out of the housing 605. For example, a coil generating a magnetic field may be located at a specified location inside the electronic device 601, and a conductive element may be arranged on the display 610 (or a surrounding structure of the display 610). The sensor 620 may detect an inductance changed as the display area of the display 610 is drawn out of the housing 605. The sensor 620 may detect a degree at which the display area of the display 610 is drawn out of the housing 605 based on the detected inductance.

According to an embodiment, the sensor 620 may include an acceleration sensor (e.g. a single or multi-axis accelerometer) and/or a gyro sensor (gyroscope). The acceleration sensor and/or the gyro sensor may detect a characteristic value that is changed as the display area of the display 610 is drawn out of the housing 605, and may detect a degree at which the display area of the display 610 is drawn out of the housing 605 based on the detected characteristic value. For example, the acceleration sensor, which is a sensor configured to measure acceleration acting in three axes (e.g., X-axis, Y-axis, or Z-axis) of the electronic device 601, may measure, estimate, and/or detect a force applied to the electronic device 601 by using the measured acceleration. The gyro sensor, which is a sensor configured to measure an angular velocity acting in three axes (e.g., X-axis, Y-axis, or Z-axis) of the electronic device 601, may measure and/or detect the amount of rotation of the electronic device 601 with respect to each axis by using the measured angular velocity information of each axis.

According to an embodiment, the sensor 620 may include a piezo sensor. For example, the electronic device 601 may measure a force applied to three axes (e.g., x-axis, y-axis, or z-axis) of the electronic device 601 through a pressure scheme. In an embodiment, the electronic device 601 may identify a state change of the electronic device by using a plurality of sensors (e.g., an acceleration sensor, a gyro sensor, and/or a piezo sensor). For example, the electronic device 601 may use 3-axis (or 9-axis) information obtained through each sensor to accurately identify the state change of the display 610 and provide a corresponding user interface. In addition, according to an embodiment, the electronic device 601 may accurately identify the state change of the display 610 based on a plurality of sensing elements (e.g., capacitance, light source, magnetism, rotation, resistance, inductance, 3-axis, or 9-axis).

Because the above-described embodiment is merely an example, the scheme of detecting a degree at which the display area of the display 610 is drawn out of the housing 605 is not limited to the above-described embodiment.

According to an embodiment, the sensor 620 may be used for a determination operation for changing the state of the display 610. For example, the electronic device 601 may include a proximity sensor, and the proximity sensor may detect an object close to the outside of the electronic device 601, without physical contact. For example, the electronic device 601 may determine the mounted state of the electronic device 601 or whether the electronic device 601 is used through the proximity sensor. In addition, when it is determined that a user input or a specified function is performed by using the sensor 620 (e.g., a proximity sensor), the electronic device 601 may change the state of the display 610 by using the rotating unit and/or the driving unit.

According to an embodiment, the memory 630 may store various data (or information). According to an embodiment, the memory 630 may store at least one program, application, data, or instructions executed by the processor 640. According to an embodiment, the memory 630 may include at least a portion of the memory 130 illustrated in FIG. 1. According to an embodiment, the memory 630 may store information or instructions for performing at least some of operations of the processor 640 (or the electronic device 601), which will be described later. According to an embodiment, the memory 630 may store instructions related to a plurality of applications executed by the processor 640. According to an embodiment, the memory 630 may store information necessary for the operation of the electronic device 601.

According to an embodiment, the memory 630 may store information obtained from an external electronic device (e.g., the electronic device 102, the electronic device 104, or the server 108) and/or information updated (or changed) based on the obtained information. For example, the electronic device 601 may use a communication module to be connected to an external electronic device through a network. The memory 630 may store information (e.g., a device name or a file stored in an external storage device) on an external electronic device obtained through the network, and a type of the network (e.g., Bluetooth, Wi-Fi, ultra wideband (UWB), or a cellular network).

According to an embodiment, the processor 640 may be operatively connected to other components of the electronic device 601 and control various operations of the electronic device 601. For example, the processor 640 may include an application processor of the electronic device 601. The processor 640 may perform various operations of the electronic device 601 by executing one or more instructions stored in the memory 630. Hereinafter, operations described as being performed by the electronic device 601 may be referred to as being performed by the processor 640.

According to an embodiment, the processor 640 may identify that the shape of the display 610 is deformed or the display 610 is moved, by using the sensor 620. For example, the processor 640 may recognize the change from the first state in which at least a portion of the display area of the display 610 is drawn into the housing 605 (or the electronic device 601) to the second state in which the at least a portion of the display area is drawn (exposed) out of the housing 605. In another example, the processor 640 may recognize that the display 610 is changed from the second state to the first state.

According to an embodiment, in the second state of the display 610, the processor 640 may identify (or recognize) the degree at which at least a portion of the display area of the display 610 is exposed to the outside of the housing 605. For example, the processor 640 may recognize the size (or width) of the display area of the display 610 exposed to the outside of the housing 605 by using the sensor 620. For example, when the display 610 corresponds to a rollable display, the processor 640 may recognize the unfolded (unrolled) length of the display 610 by using the sensor 620.

According to an embodiment, the processor 640 may display the user interface, which is distinguished from the first user interface based on the exposed degree to the outside of the housing 605 in at least a portion of the second area exposed to the front as the display 610 is changed from the first state to the second state.

According to an embodiment, the processor 640 may identify the degree at which the display 610 is exposed to the outside of the housing 605 based on the value detected through the sensor 620. For example, the processor 640 may identify the size of the second area of the display 610 based on the value detected through the sensor 620. The processor 640 may display at least one user interface in the second area based on the identification degree (e.g., the size of the second area).

According to an embodiment, the processor 640 may perform a specified function based on the size of the display area of the display 610 exposed to the outside of the housing 605, in an embodiment, the processor 640 may display, on the second area, various user interfaces which are distinguished from the first user interface and other user interfaces based on the size of the second area of the display 610 exposed to the outside of the housing 605. In an embodiment, the processor 640 may display two or more distinguished user interfaces on the second area based on the size of the second area. In an embodiment, the processor 640 may display different user interfaces corresponding to different pages of the screen based on the size of the second area. In an embodiment, the processor 640 may display a user interface corresponding to different levels based on the size of the second area. In an embodiment, the processor 640 may display a sub-menu corresponding to the user interface based on the size of the second area. In an embodiment, the processor 640 may perform a specified function based on the size of the second area. With reference to the drawings, the operation of the processor 640 (or the electronic device 601) performing various functions based on the degree at which at least a portion of the display area of the display 610 is exposed to the outside of the housing 605 will be described below.

Figure 6B:
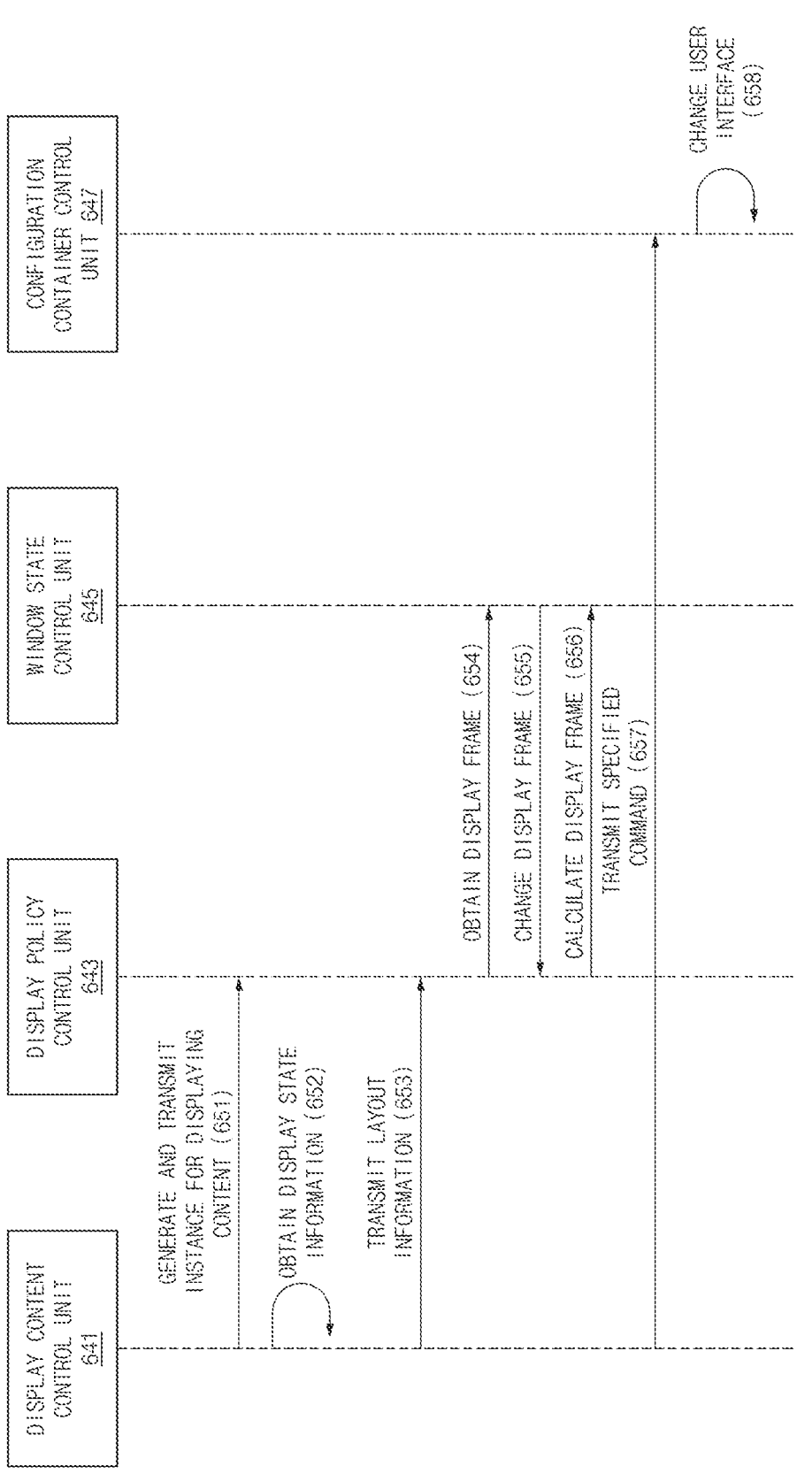
FIG. 6B is a diagram illustrating an electronic device and an operating method according to various embodiments of the disclosure.

FIG. 6B is a diagram illustrating an electronic device and an operating method according to various embodiments of the disclosure.

The electronic device 601 according to various embodiments may include a display content control unit 641, a display policy control unit 643, a window state control unit 645, and a configuration container control unit 647. According to an embodiment, at least some of the components illustrated in FIG. 6B may be changed to correspond to a platform included in the electronic device 601. According to an embodiment, the display content control unit 641, the display policy control unit 643, the window state control unit 645, and the configuration container control unit 647 may be included in the processor 640. In an embodiment, the display content control unit 641 may abstract the form of a physical display into a logical display. In an embodiment, the display policy control unit 643 may lay out each window of one or a plurality of applications displayed in the logical display. In an embodiment, the window state control unit 645 may abstract the window of the application to be displayed on the screen. In an embodiment, the configuration container control unit 647 may configure the area of the application.

According to an embodiment, the processor 640 may confirm that there is content to be output through the display 610. In operation 651, the display content control unit 641 may generate and transmit an instance for displaying contents to the display policy control unit 643.

According to an embodiment, the processor 640 may confirm that the state (e.g., display metrics) of the display 610 is changed. As the state (or shape) of the display 610 is changed, in operation 652, the display content control unit 641 may obtain (or identify) the changed display state information. For example, when the electronic device 601 is changed from the first state to the second state or from the second state to the first state, the display content control unit 641 may change the size and state of the display 610 based on the changed display state information (e.g., matrix information).

According to an embodiment, the processor 640 may lay out the execution screen of an application on the display 610. For example, the processor 640 may lay out the execution screen of the application by arranging the status bar and the navigation bar of the application. In operation 653, the display content control unit 641 may transmit layout information to the display policy control unit 643 to update the layout of the application corresponding to the changed size of the display 610. For example, the display content control unit 641 may update the layout of a navigation bar, a status bar and a screen decor window constituting an execution screen of an application, and may transmit information about the updated layout to the display policy control unit 643.

According to an embodiment, in operation 654, the display policy control unit 643 may obtain a display frame corresponding to the changed layout. In operation 655, the window state control unit 645 may change the display frame. According to an embodiment, in operation 656, the display policy control unit 643 may calculate the display frame.

According to an embodiment, when it is necessary to change the user interface (e.g., size and/or location) of the application, in operation 657, the display content control unit 641 may transmit a specified command (e.g., onConfigurationChanged) for changing the size and/or location of the execution screen (or user interface) of the application to the configuration container control unit 647.

According to an embodiment, in operation 658, the configuration container control unit 647 may change the user interface (e.g., size and/or location) of the application based on a specified command.

Figure 7A:
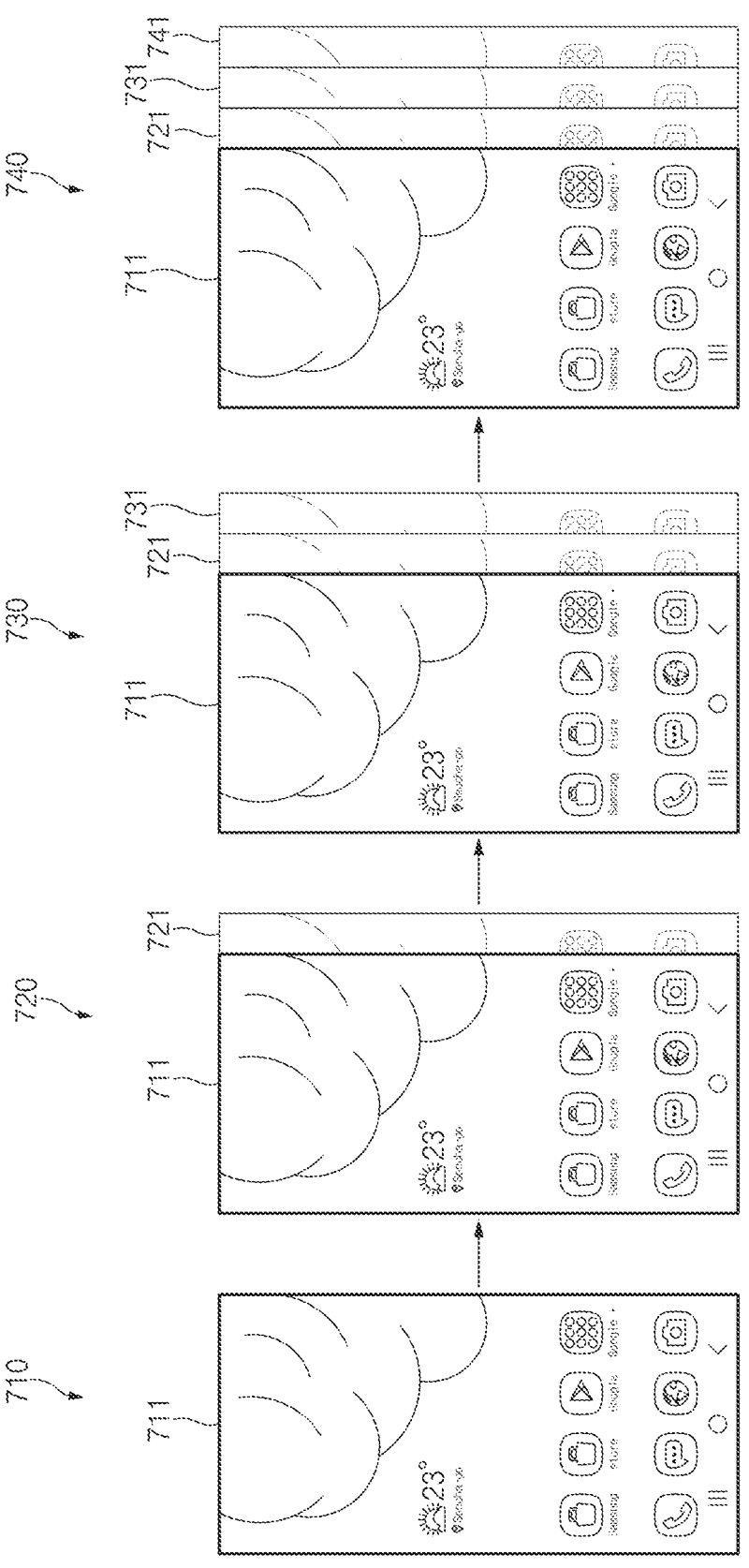
FIG. 7A illustrates an enlarged display of an electronic device according to various embodiments.

FIG. 7A illustrates an enlarged display of an electronic device according to various embodiments. According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, or the display of FIGS. 5A and 5B, or the display 610 of FIG. 6A). The display may correspond to a flexible display.

According to an embodiment, the display area of the display of the electronic device may be expanded stepwise and/or sequentially. Referring to FIG. 7A, a first state 710 in which at least a portion of the display area of the display is drawn into (or accommodated in) the electronic device, and a second states 720, 730, and 740 in which at least a portion of the display area is drawn out (or, expanded or exposed) of the electronic device are illustrated. The second states 720, 730, and 740 may include the first sub-state 720, the second sub-state 730 and the third sub-state 740 that are different from each other and correspond to the degrees at which the display area of the display is exposed to the outside. For convenience of explanation, the first sub-state 720, the second sub-state 730 and the third sub-state 740 are illustrated, but these are only examples, and the number of sub-states is not limited to that illustrated in FIG. 7A.

According to an embodiment, the display may include a first area 711 and a second area 721, 731, or 741. The first area 711 may correspond to a display area where the display is visually exposed to the outside in the first state 710 of the display. The second area 721, 731, or 741 may correspond to a display area exposed to the outside in the second state 720, 730, or 740 of the display. For example, when the display corresponds to the first sub-state 720, the display may have a display area including the first area 711 and the first sub-area 721. For example, when the display corresponds to the second sub-state 730, the display may have a display area including the first area 711, the first sub-area 721 and the second sub-area 731. For example, when the display corresponds to the third sub-state 740, the display may have a display area that includes the first area 711, the first sub-area 721, the second sub-area 731, and the third sub-area 741.

According to an embodiment, the electronic device may use a sensor (e.g., the sensor module 176 of FIGS. 1 and 2 or the sensor 620 of FIG. 6A) to identify that the display is changed from the first state 710 to the second state 720, 730, or 740. In another example, the electronic device may identify that the display is changed from the second state 720, 730, or 740 to the first state 710. Further, the electronic device may identify that the display is changed between the first sub-state 720, the second sub-state 730 and the third sub-state 740 of the second state.

According to an embodiment, the electronic device may use a sensor to identify that the display area of the display is expanded stepwise or sequentially. For example, the electronic device may identify that the display is changed from the first state 710 to the first sub-state 720 (or the expansion of the display). For example, the electronic device may identify that the display is changed from the first sub-state 720 to the second sub-state 730 (or the display is expanded). For example, the electronic device may identify that the display is changed from the second sub-state 730 to the third sub-state 740 (or the expansion of the display).

According to an embodiment, the electronic device may display different user interfaces on the first area 711, the first sub-area 721, the second sub-area 731, and the third sub-area 741 that are exposed as the display is expanded, respectively.

According to an embodiment, the electronic device may determine the sizes of the first sub-area 721, the second sub-area 731 and the third sub-area 741 in which the display is expanded, based on at least one component (e.g., a sensor module and/or a camera module) arranged in a second direction (e.g., −Z direction) of the display. For example, the electronic device may determine the sizes of the first sub-area 721, the second sub-area 731 and the third sub-area 741 based on a sensing area (a sensing area of fingerprint information, or field-of-view information of a camera module) obtained through a display and an arrangement location of a component. In an embodiment, when the sensor module and/or camera module are arranged at the left and/or right side of the electronic device when viewed in the first direction (Z-axis direction), the display may be expanded to allow the sensing area to be included in at least one of the first sub-area 721, the second sub-area 731 and the third sub-area 741. For example, it is possible to prevent a malfunction of a user input that may occur when the sensing area is arranged on a boundary line between the first sub-area 721, the second sub-area 731 and the third sub-area 741.

According to an embodiment, in the first state 710 of the display, the electronic device may display the first user interface on the first area 711 of the display. For example, the first user interface displayed on the first area 711 may include at least one of a home screen, an application drawer screen, or an execution screen of an application being executed. For example, the first user interface displayed in the first area 711 may include an execution screen of an application being executed (e.g., a gallery application, a music playback application, a memo application, a social network service application, or a file management application). As another example, the first user interface displayed on the first area 711 may include at least one of a lock screen (e.g., a lock screen) or an always-on-display (AOD). For example, the first user interface displayed on the first area 711 may include at least one of a screen for obtaining a user input, a screen for displaying time and/or image information, or a screen for informing a lock state.

In an embodiment, in the first sub-state 720 of the display, the electronic device may display the second user interface on the first sub-area 721 of the second area of the display. In an embodiment, when the display is in the second sub-state 730, the electronic device may display the third user interface on the second sub-area 731 of the second area of the display. In an embodiment, in the third sub-state 740 of the display, the electronic device may display the fourth user interface on the third sub area 741 of the second area of the display. In an embodiment, the first to third sub areas 721, 731, and 741 may represent areas for temporarily storing an object. Hereinafter, an object may have the same or similar meaning as an item, and may be referred to as an icon. In another embodiment, the fast to third sub-areas 721, 731, and 741 may display an area for selecting a service (e.g., a background screen, a lock screen, or a widget) provided by the application (or function) being executed. Hereinafter, an object may mean a menu, image or text corresponding to a service.

According to various embodiments, the electronic device may display various user interfaces on the expanded display area of the display corresponding to the degree at which the display is expanded, thereby improving user convenience.

According to various embodiments, the second area 721, 731, and 741 may be related to the second area 520 of the display area (e.g., the first area 510 and the second area 520) of FIGS. 5A and 5B. For example, as the display is expanded, the first area 710 may display the first user interface, and the second to fourth user interfaces may be displayed on the second area 520 of FIGS. 5A and 5B expanded. As another example, the second area 721, 731, and 741 may include at least a portion of the first area 510 of FIGS. 5A and 5B displaying the first user interface. For example, as the display expands, the second user interface may be displayed on an area derived outside the housing of an electronic device among the first area 510. The first user interface may be displayed on a portion of the second area 520 visually exposed to the outside of the housing, and an area other than the area in which the second user interface is displayed among the first area 510.

Although not shown in the drawings, in the second sub-state 720 and the third sub-state 730, the electronic device may display the user interface on the sub-display (e.g., the sub-display 410 of FIGS. 4A and 4B). For example, in the second sub-state 720, the electronic device may display the first user interface and the second user interface on the first area 711 and the first sub-area 721 through the display 210 and display the third user interface and the fourth user interface on the second sub-area 731 and the third sub-area 741 through the display 410.

Figure 7B:
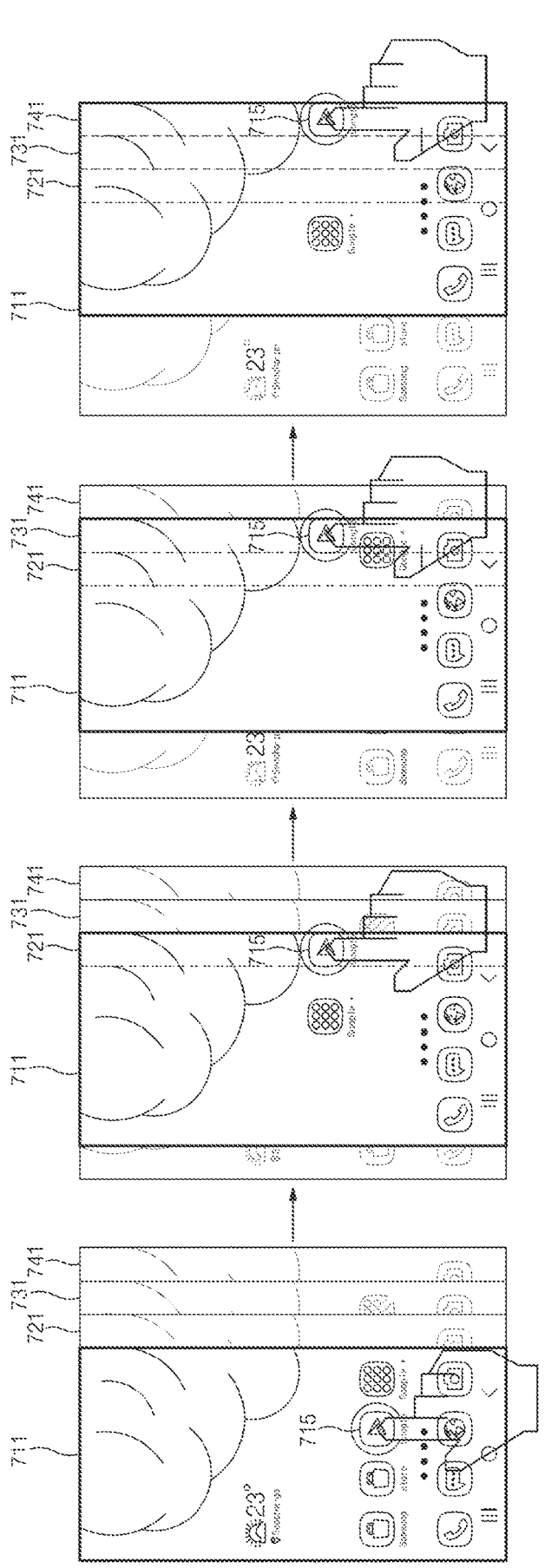
FIG. 7B illustrates an electronic device performing a specified operation in response to a user input according to various embodiments.

FIG. 7B illustrates an electronic device performing a specified operation in response to a user input according to various embodiments. For example, the display of the electronic device may be in the third sub-state 740.

According to an embodiment, the electronic device may recognize different display areas exposed as the display is expanded, and display different user interfaces (e.g., the second user interface, the third user interface or the fourth user interface) that is distinguished based on a degree at which the display area of the display is exposed to the outside. The electronic device may provide an intuitive use experience to the user of the electronic device by performing a specified function corresponding to the location at which a user input is received on the expanded display.

According to an embodiment, the electronic device may display a different user interface corresponding to the degree at which the display area of the display is exposed to the outside. For example, the electronic device may display the first user interface on the first area 711 of the display, display the second user interface on the first sub-area 721, display the third user interface on the second sub-area 731, and display the fourth user interface on the third sub-area 741. For example, the first user interface may correspond to the first page of the home screen. For example, the second user interface may correspond to the second page of the home screen. For example, the third user interface may correspond to the third page of the home screen. For example, the fourth user interface may correspond to the fourth page of the home screen.

According to an embodiment, the electronic device may enter the editing mode of the screen. For example, the electronic device may receive a user input (e.g., a long touch input) for entering the editing mode of the screen. According to another embodiment, the electronic device may enter the editing mode of the screen based on the sensing information. For example, the electronic device may enter the editing mode of the screen based on a change in the state of the display (e.g., from the first state 710 to the second state 720, or from the second state 720 to the first state 710), a user's approach, or whether the electronic device is in use.

According to an embodiment, the electronic device may receive a user input related to an object displayed on a screen, and may perform a specified function in response to the received user input.

In an embodiment, the electronic device may move an object 715 based on a user input (e.g., a drag input) for moving the object 715. Alternatively, the electronic device may copy and move the object 715 based on a user input.

When recognizing that the display location of the object 715 is moved from the first area 711 to the first sub-area 721 based on a user input, the electronic device may activate and display the user interface corresponding to the first sub-area 721. For example, the electronic device may display the user interface corresponding to the first sub-area 721 together with a specified effect on the display. For example, when recognizing a user input for moving the object 715 from a first location on the first area 711 to a second location on the first sub-area 721, the electronic device may display a specified effect of overlaying the second user interface corresponding to the first sub-area 721 on a portion of the first user interface. In various embodiments, the electronic device may display a page turning effect of switching from the first user interface to the second user interface based on a user input. In various embodiments, the electronic device may display an effect of changing the transparency of the second user interface to emphasize the second user interface based on a user input.

In an embodiment, when recognizing that the display location of the object 715 is moved from the first sub-area 721 to the second sub-area 731 based on the user input, the electronic device may activate and display the user interface corresponding to the second sub-area 731. For example, the electronic device may display the user interface corresponding to the second sub-area 731 together with a specified effect on the display. For example, when the display location of the object 715 is located in the second sub-area 731, the electronic device may display a specified effect of overlaying and displaying the third user interface corresponding to the second sub-area 731 on a portion of the first user interface. As another example, when the display location of the object 715 is located in the second sub-area 731, the electronic device may display a specified effect of overlaying and displaying the third user interface corresponding to the second sub-area 731 on a portion of the second user interface. In various examples, the electronic device may display a page turning effect of switching from the second user interface to the third user interface. In various examples, the electronic device may display an effect of changing the transparency of the third user interface to emphasize the third user interface. In a scheme similar to the above-described scheme, when recognizing that the display location of the object 715 is moved to the third sub area 741 based on the user input, the electronic device may activate and display the user interface corresponding to the third sub-area 741. In this case, the electronic device may display the fourth user interface corresponding to the third sub-area 741 together with a specified effect (e.g., overlay, page turning, and/or transparency changing).

According to another embodiment, when recognizing that the display location of the object 715 is moved from the third sub-area 741 to the second sub-area 731, the electronic device may activate and display the third user interface. In this case, the electronic device may display the first user interface, the second user interface and the fourth user interface to overlap at least a portion of the activated third user interface together with a specified effect (e.g., overlay, page turning, and/or transparency changing). In a similar scheme, when the display location of the object 715 is changed, the electronic device may activate the user interface corresponding to the changed display location, and display another user interface to overlap at least a portion of the activated user interface together with a specified effect. The user of the electronic device may visually and easily recognize whether the user interface is activated.

Figure 8:
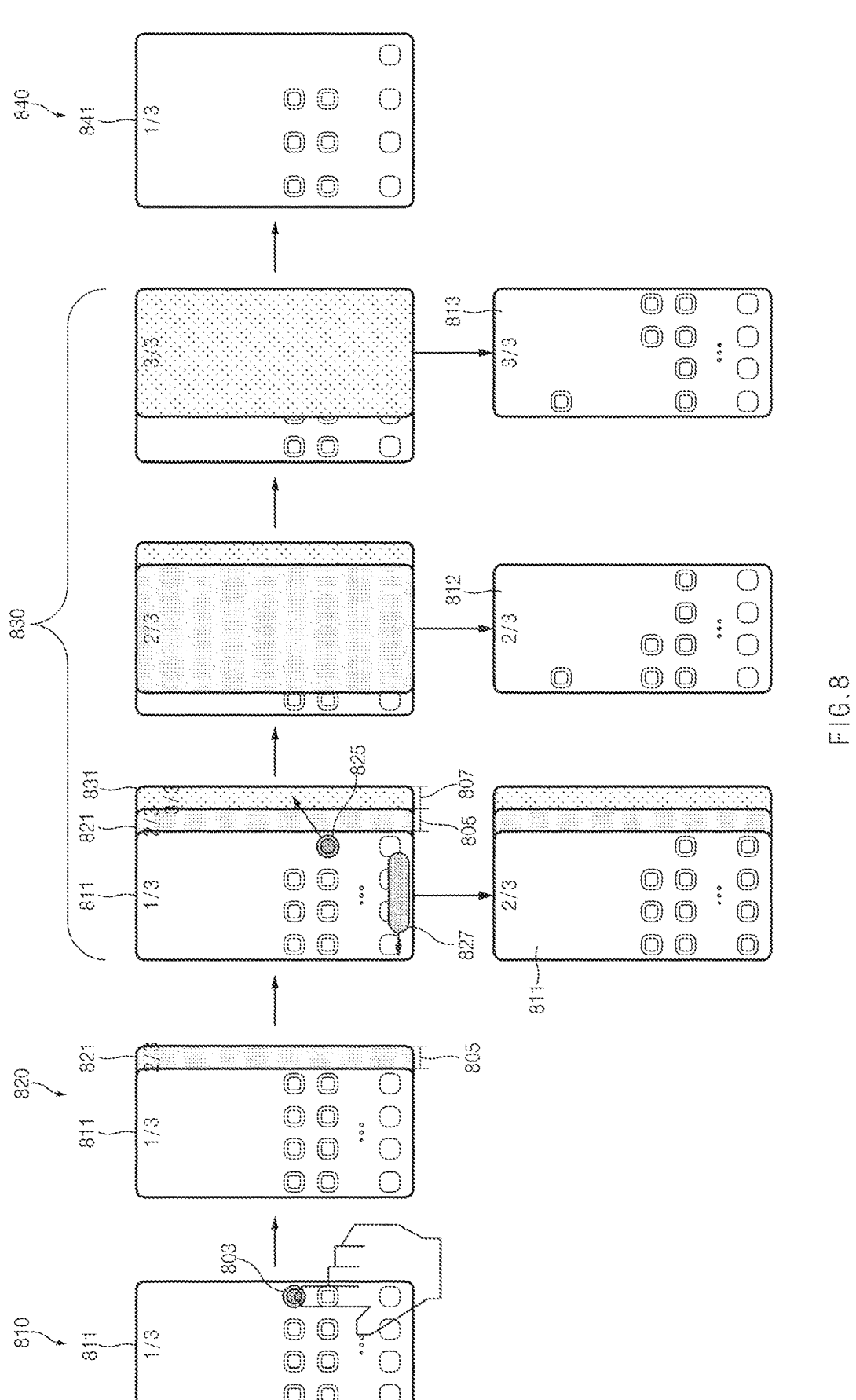
FIG. 8 illustrates an embodiment in which an electronic device moves an object to a page corresponding to a degree at which a display area of a display is exposed to an outside according to various embodiments.

FIG. 8 illustrates an embodiment in which an electronic device moves an object to a page corresponding to a degree at which a display area of a display is exposed to an outside according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display 610 of FIG. 6A, or the display of FIGS. 7A and 7B). The display may correspond to a flexible display.

According to an embodiment, the display area of the display of the electronic device may be expanded stepwise and/or sequentially. Referring to FIG. 8, a first state 810 in which at least a portion of the display area of the display is drawn into (or accommodated in) the electronic device, and a second states 820, 830, and 840 in which at least a portion of the display area is drawn out (or, expanded or exposed) of the electronic device are illustrated. The second states 820, 830, and 840 may include the first sub-state 820, the second sub-state 830, and the third sub-state 840 that are different from each other and correspond to the degrees at which the display area of the display is exposed to the outside. For convenience of explanation, the first sub-state 820, the second sub-state 830 and the third sub-state 840 are illustrated, but these are only examples, and the number of sub-states is not limited to that illustrated in FIG. 8.

According to an embodiment, the display may include a first area 811 and second areas 821, 831, and 841. The first area 811 may correspond to a display area where the display is visually exposed to the outside in the first state 810 of the display. The second areas 821 and 831 may correspond to a display area exposed to the outside in the second states 820 and 830 of the display, respectively. For example, when the display corresponds to the first sub-state 820, the display may have a display area including the first area 811 and the first sub-area 821. For example, when the display corresponds to the second sub-state 830, the display may have a display area including the first area 811, the first sub-area 821 and the second sub-area 831. For example, when the display corresponds to the third sub-state 840, the display may have a display area of the maximum expanded area 841 that includes the first area 811, the first sub area 821, and the second sub-area 831.

According to an embodiment, the electronic device may display the first user interface corresponding to a specified page of the home screen on the first area 811 in the first state 810. The first user interface may include at least one object (or an icon). Hereinafter, the first to fourth user interfaces described above may include a user interface corresponding to a home screen.

According to an embodiment, the electronic device may receive a user input 803 for entering the editing mode of the screen. For example, the user input 803 for entering the editing mode of the screen may include a long touch input. In various embodiments, the user input 803 for entering the editing mode of the screen may be received in the second state 820 or 830. For example, the editing mode is a mode for moving an object (or icon) included in the user interface, and may represent an effect specified in the first user interface. For example, the specified effect may include an effect in which an object (or icon) included in the first user interface vibrates, an effect of displaying a grid pattern between each object (or icon), or an effect of changing the size of an object (or icon) corresponding to the user input 803. In addition, in this description, before entering the editing mode and after entering the editing mode may be referred to as the first user interface.

According to an embodiment, the electronic device may use a sensor (e.g., the sensor module 176 of FIGS. 1 and 2 or the sensor 620 of FIG. 6A) to recognize that the display area of the display is expanded stepwise or sequentially.

According to an embodiment, the electronic device may use the sensor to recognize that the display is changed from the first state 810 to the first sub-state 820. For example, the electronic device may recognize that the display area of the display is drawn out by a first length value 805 than the display area in the first state 810. Based on entering the editing mode of the screen, the electronic device may display at least a portion of the second user interface corresponding to the second page of the home screen on the first sub-area 821 exposed as the display expands. For example, the user interface corresponding to the direction in which the screen is expanded among the second user interface (e.g., a second page 812) may be displayed on the first sub-area 821. When the display is expanded in the third direction (e.g., X-axis direction), the electronic device may display at least a partial area of the second user interface in the third direction (e.g., X-axis direction). When the display is expanded in the fourth direction (e.g., −X-axis direction), the electronic device may display at least a partial area of the second user interface in the fourth direction (e.g., −X-axis direction). As another example, the first sub-area 821 may be displayed based on an area in which an object (or an icon) is arranged in the second user interface. For example, the electronic device may identify an area in which an object (or icon) is arranged in the second user interface, and may display an area including the identified object (or icon) on the first sub-area 821. In another embodiment (not shown), in the first sub-state 820, the electronic device may display at least a portion of a user interface other than the second user interface based on a user input (e.g., the user input 803 for entering the editing mode of the screen) obtained from the first user interface. For example, when the home screen includes three or more pages, the user interface displayed in the first sub-state 820 may display at least a portion of the third user interface other than the second user interface. After the electronic device obtains a user input (e.g., the user input 803 for entering the editing mode of the screen) obtained through the first user interface and enters the editing mode based on the acquisition, when it is determined that the object (or icon) corresponding to the user input is related to the object (or icon) displayed on the third user interface (e.g., a third page 813), the electronic device may change the second user interface displayed on the first sub-area 821 to the third user interface.

According to an embodiment, the electronic device may use a sensor to recognize that the display is changed from the first sub-state 820 to the second sub-state 830. For example, the electronic device may recognize that the display area of the display is drawn out more by a second length value 807 than the display area of the first sub-state 820. The electronic device may display at least a portion of the third user interface corresponding to the third page of the home screen on the second sub area 831 exposed as the display is expanded. Those skilled in the art will understand that the same contents as those of the first sub-area 821 are applied to the operation related to the second sub-area 831.

According to an embodiment, the electronic device may determine the first sub-state 820 and the second sub-state 830 based on the maximum expanded area (e.g., expanded mode) of the display. For example, when the home screen includes N pages, the electronic device uses the reference distance based on Equation 1 to determine each sub-state (e.g., the first sub-state 820 or the second sub-state 830).

$$\text{Reference distance} = \text{Maximum expanded distance} / N{-}1 \qquad \text{(Equation 1)}$$

For example, when the maximum expanded distance of the display is 4 cm and the home screen includes three pages, the electronic device may use 2 cm derived based on Equation 1 above as the reference for determining which sub-state the display corresponds to. For example, the electronic device may display the second page of the home screen in the first sub-area 821 when the expanded distance is greater than 0 (zero) and less than 2 cm as the display is expanded. The electronic device may display the third page of the home screen in the second sub-area 831 when the expanded distance is 2 cm or more and less than 4 cm as the display is expanded. When the expanded distance of the display reaches the maximum expanded distance (e.g., 4 cm), the electronic device may display the fourth user interface in which the first user interface is simply expanded in the maximum expansion area 841.

According to an embodiment, the electronic device may receive a user input related to an object displayed on a screen, and perform a specified function in response to the received user input. According to an embodiment, the electronic device may receive a user input 825 related to an object displayed on the home screen. For example, the electronic device may receive the user input 825 for moving an object (or an icon) displayed on the home screen in the second sub-state 830. For example, the user input may include a drag input. In another example, the electronic device may receive a swipe input 827 in a specified area on the home screen. In this case, the electronic device may sequentially change a page of the home screen depending on the direction of the swipe input 827. According to an embodiment, based on the moving speed of the swipe input 827, several pages of the home screen may be moved at once. For example, when it is determined that the swipe input 827 has the first speed, the object (or icon) may move from the first user interface to the second user interface. When it is determined that the swipe input 827 has the second speed, the object (or icon) may move from the first user interface to the third user interface.

According to an embodiment, the electronic device may move (or copy) an object to a page corresponding to the user input 825 related to the object.

In an embodiment, when recognizing that the display location of the object has moved to the first sub-area 821 based on the user input 825 related to the object, the electronic device may activate the second user interface. For example, the electronic device may display a specified effect of overlaying the second user interface on a portion of the first user interface. As another example, the electronic device may display a page turning effect of switching from the first user interface to the second user interface, or an effect of changing the transparency of the second user interface to emphasize the second user interface. In an embodiment, the electronic device may move the object to a specified page based on recognizing that the user input 825 related to the object is released while the second user interface is activated. When the user input 825 related to the object is released while the second user interface is activated, the electronic device may move the object onto the second page 812 of the home screen corresponding to the first sub-area 821. For example, the electronic device may display the object at an empty location on the second page 812 of the home screen based on a specified order. For example, the specified order may be set in the electronic device in advance. For example, the electronic device may arrange the object (e.g., the first object) in the order of right columns in the first row, starting from the left upper end, in the empty area of the second page 812. Thereafter, the electronic device may arrange another object (e.g., the second object) in a second row. As another example, the electronic device may move the object to a location where the user input 825 related to the object is released while the second user interface is activated. For example, when the location at which the user input 825 related to the object is released is an empty area, the electronic device may directly arrange the object in the corresponding area. As the user input 825 related to the object moves, when the object overlaps an object previously arranged in the second user interface, the electronic device may provide an area which is empty after moving the previously arranged object.

In an embodiment, when recognizing that the display location of the object has moved to the second sub-area 831 based on the user input 825 related to the object, the electronic device may activate the third user interface. For example, the electronic device may display a specified effect of overlaying the third user interface on a portion of the first user interface or the second user interface. In another example, the electronic device may display a page turning effect of switching from the second user interface to the third user interface, or an effect of changing the transparency of the third user interface to emphasize the third user interface. In an embodiment, the electronic device may move the object to a specified page based on recognizing that the user input 825 related to the object is released while the third user interface is activated. When the user input 825 related to the object is released while the third user interface is activated, the electronic device may move the object onto the third page 813 of the home screen corresponding to the second sub-area 831. For example, the electronic device may display the object at an empty location on the third page 813 of the home screen based on a specified order. In an embodiment, those skilled in the art will understand that the same content as the described first sub-area 821 is applied to an operation related to the second sub-area 831.

In an embodiment, the electronic device may end the editing mode of the screen. For example, the electronic device may end the editing mode of the screen based on recognizing that the display maintains the fully expanded state for a specified time. As another example, the electronic device may end the editing mode of the screen based on receiving a user input (e.g., a short touch) for terminating the editing mode from the user while the display is fully expanded. In various examples, the electronic device may end the editing mode of the screen without another input while the display is fully expanded. In this case, the electronic device may display the fourth user interface which is obtained by simply expanding the first user interface in the maximum expansion area 841.

In an embodiment, the electronic device may display at least a portion of a user interface (e.g., the second user interface and the third user interface) other than the first user interface in the expanded area (e.g., the first sub-area 821 and the second sub-area 831), thereby quickly performing the operation in the editing mode. According to various embodiments of the disclosure, when the home screen includes a plurality of pages (e.g., five), the operation time and the number of user inputs caused by sequentially moving each page may be reduced, thereby providing an effective editing to the user.

Figure 9:
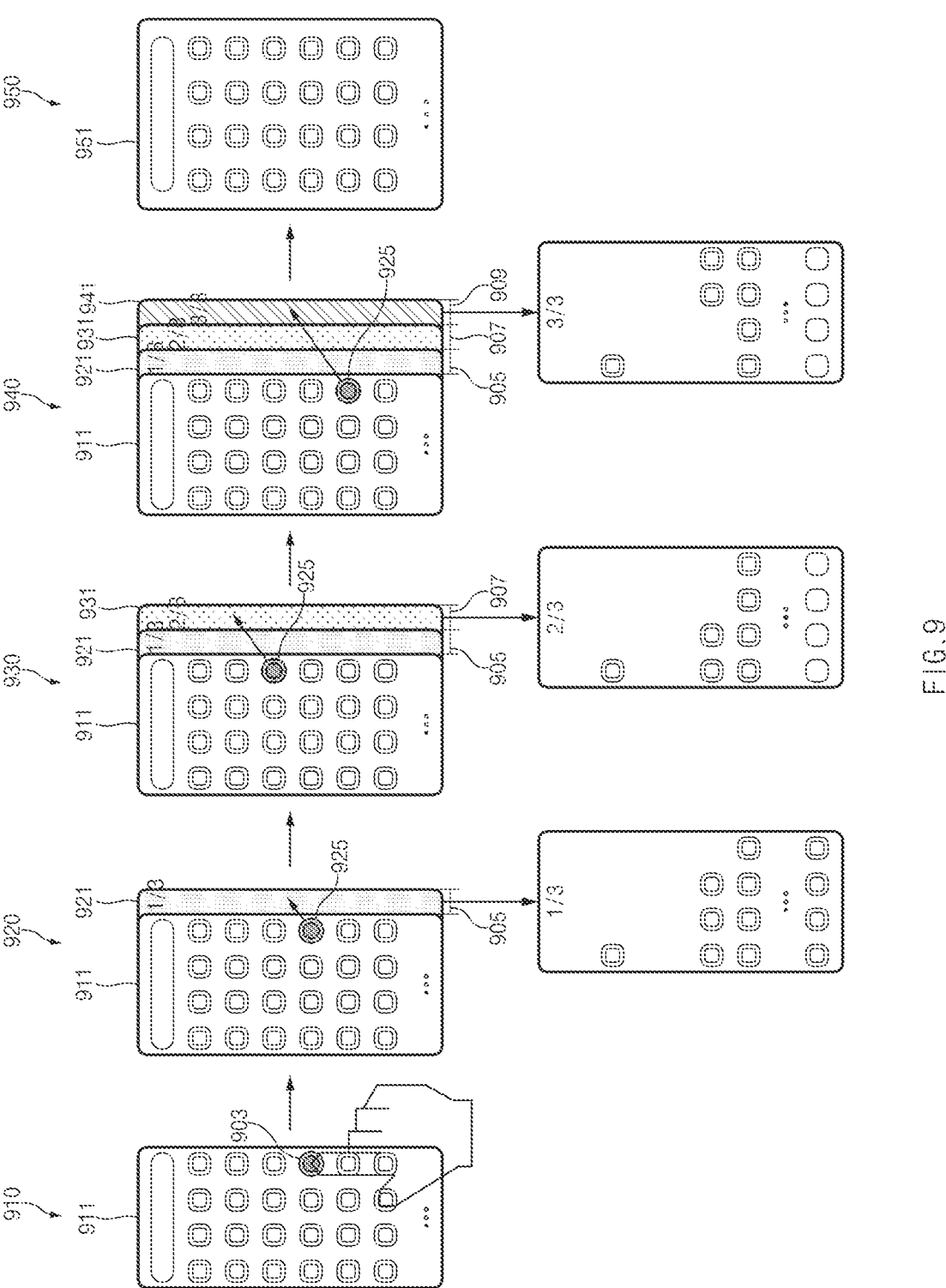
FIG. 9 illustrates an example in which an electronic device moves an object to a page corresponding to a degree at which a display area of a display is exposed to an outside according to various embodiments.

FIG. 9 illustrates an example in which an electronic device moves an object to a page corresponding to a degree at which a display area of a display is exposed to an outside according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display 610 of FIG. 6A, the display of FIGS. 7A and 7B, or the display of FIG. 8). The display may correspond to a flexible display.

According to an embodiment, the display area of the display of the electronic device may be expanded stepwise and/or sequentially. Referring to FIG. 9, a first state 910 in which at least a portion of the display area of the display is drawn into (or accommodated in) the electronic device, and a second states 920, 930, 940, and 950 in which at least a portion of the display area is drawn out (or, expanded or exposed) of the electronic device are illustrated. The second states 920, 930, 940, and 950 may include the first sub-state 920, the second sub-state 930, the third sub-state 940, and the fourth sub-state 950 that are different from each other and correspond to the degrees at which the display area of the display is exposed to the outside. For convenience of explanation, the first sub-state 920, the second sub-state 930, the third sub-state 940 and the fourth sub-state 950 are illustrated, but these are only examples, and the number of sub-states is not limited to that illustrated in FIG. 9.

According to an embodiment, the display may include a first area 911 and a second area 921, 931, or 941. The first area 911 may correspond to a display area where the display is visually exposed to the outside in the first state 910 of the display. The second area 921, 931, or 941 may correspond to a display area exposed to the outside in the second state 920, 930, or 940 of the display. For example, when the display corresponds to the first sub-state 920, the display may have a display area including the first area 911 and the first sub-area 921. For example, when the display corresponds to the second sub-state 930, the display may have a display area including the first area 911, the first sub-area 921 and the second sub-area 931. For example, when the display corresponds to the third sub-state 940, the display may have a display area that includes the first area 911, the first sub-area 921, the second sub-area 931, and the third sub-area 941. For example, when the display corresponds to the fourth sub-state 950, the display may have a display area of the maximum expanded area 951 that includes the first area 911, the first sub-area 921, the second sub-area 931, and the third sub-area 941.

According to an embodiment, the electronic device may display the first user interface corresponding to an application drawer screen in the first area 911 in the first state 910. The first user interface may include at least one object (or an icon). In the description below, the second to fourth user interfaces described above may include a user interface corresponding to a home screen, and the fifth user interface may include a user interface corresponding to the application drawer screen. For example, the fifth user interface may correspond to a user interface in which the first user interface corresponding to the application drawer screen is simply expanded.

According to an embodiment, the electronic device may receive a user input 903 for entering the editing mode of the screen. For example, the user input 903 for entering the editing mode of the screen may include a long touch input. In various embodiments, the user input 903 for entering the editing mode of the screen may be received in the second state 920, 930, or 940. According to an embodiment, in a state in which the application drawer screen is displayed, when the electronic device may use a sensor (e.g., the sensor module 176 of FIGS. 1 and 2 or the sensor 620 of FIG. 6A) to recognize that the display area of the display is expanded, the display may enter the editing mode of the screen.

According to an embodiment, the electronic device may use a sensor to recognize that the display area of the display is expanded stepwise or sequentially.

According to an embodiment, the electronic device may use the sensor to recognize that the display is changed from the first state 910 to the first sub-state 920. For example, the electronic device may recognize that the display area of the display is drawn out by a first length value 905 than the display area in the first state 910. Based on entering the editing mode of the screen, the electronic device may display the second user interface corresponding to the first page of the home screen on the first sub-area 921 exposed as the display expands.

According to an embodiment, the electronic device may receive a user input related to an object displayed on a screen, and perform a specified function in response to the received user input. According to an embodiment, the electronic device may receive a user input 925 related to an object displayed on the application drawer screen. For example, the electronic device may receive the user input 925 for moving an object (or an icon) displayed on the application drawer screen. For example, the user input may include a drag input.

According to an embodiment, the electronic device may move the object to a page corresponding to the user input 925 related to the object. In an embodiment, when recognizing that the display location of the object has moved to the first sub-area 921 based on the user input 925 related to the object, the electronic device may display the object on the first page of the home screen corresponding to the first sub-area 921. Alternatively, the electronic device may copy and display the object on the first page of the home screen corresponding to the first sub-area 921. In an embodiment, the electronic device may move (or copy) the object to the first page of the home screen corresponding the second user interface based on recognizing that the user input 925 related to the object is released on the second user interface displayed in the first sub area 921. For example, the electronic device may display the object at an empty location on the first page of the home screen based on a specified order.

According to an embodiment, the electronic device may use the sensor to recognize the second sub-state 930 in which the display area of the display is drawn out more by a second length value 907 than the display area of the first sub-state 920. The electronic device may display the third user interface corresponding to the second page of the home screen in the second sub-area 931 exposed as the display is expanded.

According to an embodiment, the electronic device may move the object to a page corresponding to the user input 925 related to the object. In an embodiment, when the electronic device recognizes that the display location of the object has moved to the second sub-area 931 based on the user input 925 related to the object, the electronic device may move the object to the second page of the home screen corresponding to the second sub-area 931. Alternatively, the electronic device may copy and display the object on the second page of the home screen corresponding to the second sub-area 931. In an embodiment, the electronic device may move (or copy) the object to the second page of the home screen corresponding to the third user interface based on recognizing that the user input 925 related to the object is released on the third user interface displayed in the second sub-area 931. For example, the electronic device may display the object at an empty location on the second page of the home screen based on a specified order.

According to an embodiment, the electronic device may use the sensor to recognize the third sub-state 940 in which the display area of the display is drawn out more by a third length value 909 than the display area of the second sub-state 930. The electronic device may display the fourth user interface corresponding to the third page of the home screen in the third sub-area 941 exposed as the display is expanded.

According to an embodiment, the electronic device may move the object to a page corresponding to the user input 925 related to the object. In an embodiment, when the electronic device recognizes that the display location of the object has moved to the third sub-area 941 based on the user input 925 related to the object, the electronic device may move the object to the third page of the home screen corresponding to the third sub-area 941. Alternatively, the electronic device may copy and display the object on the third page of the home screen corresponding to the third sub-area 941. In an embodiment, the electronic device may move (or copy) the object to the third page of the home screen corresponding to the fourth user interface based on recognizing that the user input 925 related to the object is released on the fourth user interface displayed in the third sub-area 941. For example, the electronic device may display the object at an empty location on the third page of the home screen based on a specified order.

According to an embodiment, the electronic device may determine the first sub-state 920, the second sub-state 930 and the third sub-state 940 based on the maximum expanded area (e.g., expanded mode) of the display. For example, when the home screen includes M pages, the electronic device uses the reference distance based on Equation 2 to determine each sub-state (e.g., the first sub-state 920, the second sub-state 930 or the third sub-state 940).

$$\text{Reference distance} = \text{Maximum expanded distance}/M - 1 \qquad \text{(Equation 2)}$$

For example, when the maximum expanded distance of the display is 6 cm and the home screen includes three pages, the electronic device may use 2 cm derived based on Equation 2 above as the reference for determining which sub-state the display corresponds to. For example, the electronic device may display the first page of the home screen in the first sub-area 921 when the expanded distance is greater than 0 (zero) and less than 2 cm as the display is expanded. The electronic device may display the second page of the home screen in the second sub-area 931 when the expanded distance is 2 cm or more and less than 4 cm as the display is expanded. The electronic device may display the third page of the home screen in the third sub-area 941 when the expanded distance is 4 cm or more and less than 6 cm as the display is expanded. When the expanded distance of the display reaches the maximum expanded distance (e.g., 6 cm), the electronic device may display the fourth user interface in which the first user interface (e.g., the application drawer screen) is simply expanded in the maximum expanded area 951.

In an embodiment (not shown), when recognizing that the display location of the object has moved to each sub-area (e.g., the first sub-area 921, the second sub-area 931, and the third sub-area 941) based on the user input 925 related to the object, the electronic device may display a specified effect of overlaying and displaying the first user interface and a user interface corresponding to the area where the user input 925 is located. For example, in the third sub-state 940, when the user input 925 is located in the second sub-area 931, the electronic device may display at least a portion of the first user interface, at least a portion of the second user interface, a third user interface, and at least a portion of the fourth user interface. As another example, the electronic device may display a page turning effect or an effect of changing transparency as a specified effect, but the embodiments are not limited thereto.

In an embodiment, the electronic device may end the editing mode of the screen. For example, the electronic device may end the editing mode of the screen based on recognizing that the display maintains the fully expanded state for a specified time. As another example, the electronic device may end the editing mode of the screen based on receiving a user input (e.g., a short touch) for terminating the editing mode from the user while the display is fully expanded. In various examples, the electronic device may end the editing mode of the screen without another input while the display is fully expanded. In this case, the electronic device may display the fifth user interface which is obtained by simply expanding the first user interface (e.g., the application drawer screen) in the maximum expanded area 951.

In an embodiment, although the user interface (e.g., the home screen) of another service has been described based on the expansion of the display in the first user interface (e.g., the application drawer screen), the application drawer screen may be displayed as the second user interface to the fourth user interface. For example, when a plurality of application drawer screens are configured, based on the expansion of the display, the electronic device may display the first user interface that is the first page of the application drawer screen, the second user interface that is the second page of the application drawer screen, and the third user interface that is the third page of the application drawer screen. The electronic device may display the first user interface in the first area 911, at least a portion of the second user interface in the first sub-area 921, and at least a portion of the third user interface in the second sub-area 931.

Figure 10:
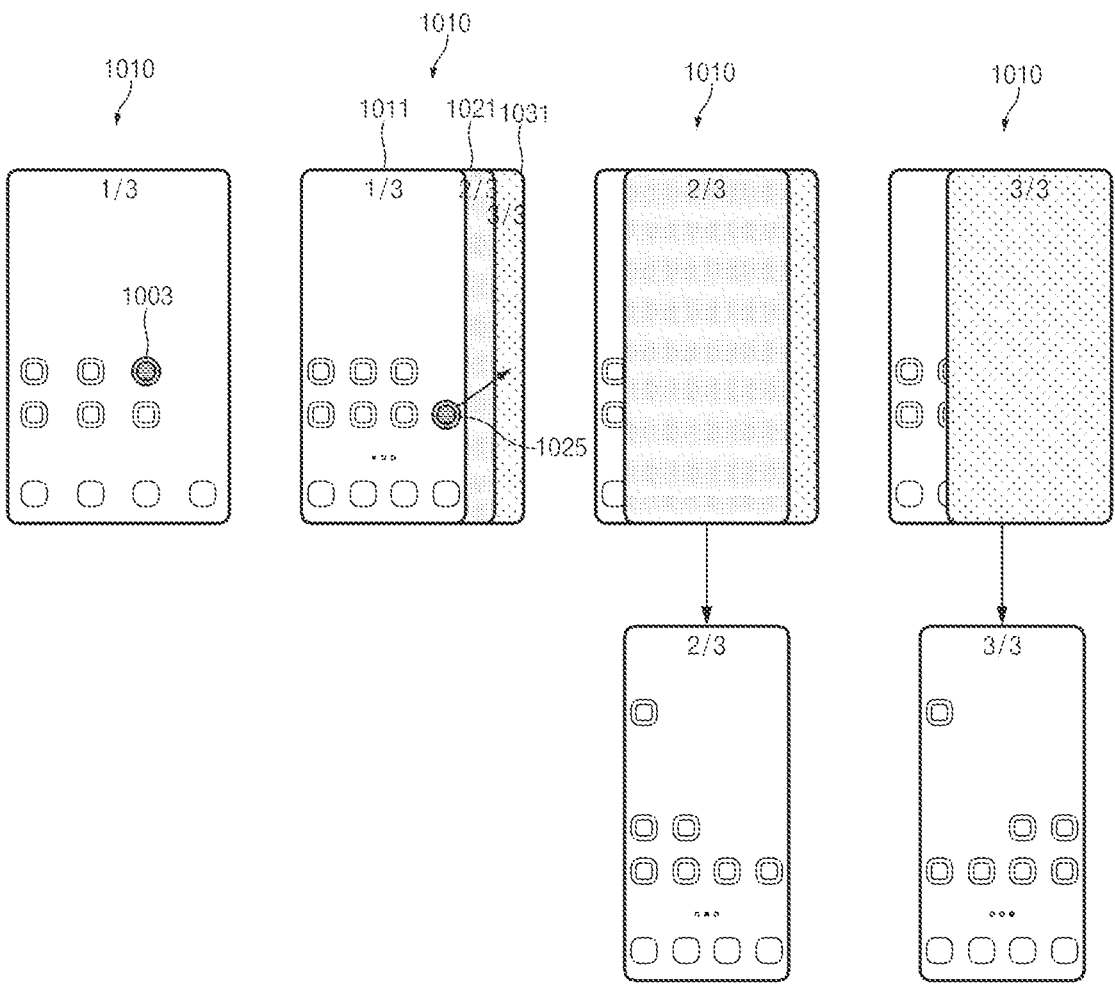
FIG. 10 illustrates an example in which an electronic device enters an editing mode of a screen to move an object in a state in which a display is expanded according to various embodiments.

FIG. 10 illustrates an example in which an electronic device enters an editing mode of a screen to move an object in a state in which a display is expanded according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display 610 of FIG. 6A, the display of FIGS. 7A and 7B, or the displays of FIGS. 8 and 9). The display may correspond to a flexible display.

According to an embodiment, the display area of the display of the electronic device may be expanded or reduced stepwise and/or sequentially. Referring to FIG. 10, a state 1010 in which the display is expanded is shown. In an embodiment, in the display expanded state 1010, the user interface corresponding to the first page of the home screen before a user input 1003 is obtained may be different from the user interface corresponding to the first page of the home screen in which a first area 1011 is displayed after the user input 1003 is obtained. For example, when the user interface corresponding to the first page of the home screen before the user input 1003 is obtained is compared with the user interface corresponding to the first page of the home screen in which the first area 1011 is displayed, an interval between objects (or icons) included in the interface may be larger. According to an embodiment (not shown), the user interface corresponding to the first page may be changed based on the expanded size of the display, and intervals between objects (or icons) included in the user interface according to the first sub-state (e.g., the first sub-state 820 of FIG. 8) and the second sub-state (e.g., the second sub-state 830 of FIG. 8) may be different from each other. Hereinafter, the first page of the home screen displayed before and after the user input 1003 is obtained will be described as the first user interface.

According to an embodiment, the electronic device may receive the user input 1003 for entering the editing mode of the screen. For example, the user input 1003 for entering the editing mode of the screen may include a long touch input.

According to an embodiment, the electronic device may enter the editing mode of the screen based on the received user input 1003.

According to an embodiment, in the editing mode, the electronic device may display a user interface corresponding to a different page in the display area of the display in the expanded state 1010. In an embodiment, the electronic device may display the first user interface corresponding to the first page of the home screen on the first area 1011 of the display in the expanded state 1010, display the second user interface corresponding to the second page of the home screen on a first sub-area 1021, and display the third user interface corresponding to the third page of the home screen on a second sub-area 1031. The first user interface may include at least one object (or an icon).

According to an embodiment, the electronic device may receive a user input related to an object displayed on a screen, and perform a specified function in response to the received user input. According to an embodiment, the electronic device may receive a user input 1025 related to an object displayed on the home screen. For example, the electronic device may receive the user input 1025 for moving an object (or an icon) displayed on the home screen. For example, the user input may include a drag input.

According to an embodiment, the electronic device may move the object to a page corresponding to the user input 1025 related to the object.

In an embodiment, when recognizing that the display location of the object has moved to the first sub-area 1021 based on the user input 1025 related to the object, the electronic device may activate the second user interface. For example, the electronic device may display a specified effect of overlaying the second user interface on a portion of the first user interface. As another example, the electronic device may display a page turning effect of switching from the first user interface to the second user interface, or an effect of changing the transparency of the second user interface to emphasize the second user interface. In an embodiment, the electronic device may move (or copy) the object to the second page of the home screen corresponding to the second user interface, based on recognizing that the user input 1025 related to the object is released while the second user interface is activated.

In an embodiment, when recognizing that the display location of the object has moved to the second sub-area 1031 based on the user input 1025 related to the object, the electronic device may activate the third user interface. For example, the electronic device may display a specified effect of overlaying the third user interface on a portion of the first user interface or the second user interface. In another example, the electronic device may display a page turning effect of switching from the second user interface to the third user interface, or an effect of changing the transparency of the third user interface to emphasize the third user interface. In an embodiment, the electronic device may move (or copy) the object to the third page of the home screen corresponding to the third user interface, based on recognizing that the user input 1025 related to the object is released while the third user interface is activated.

Figure 11:
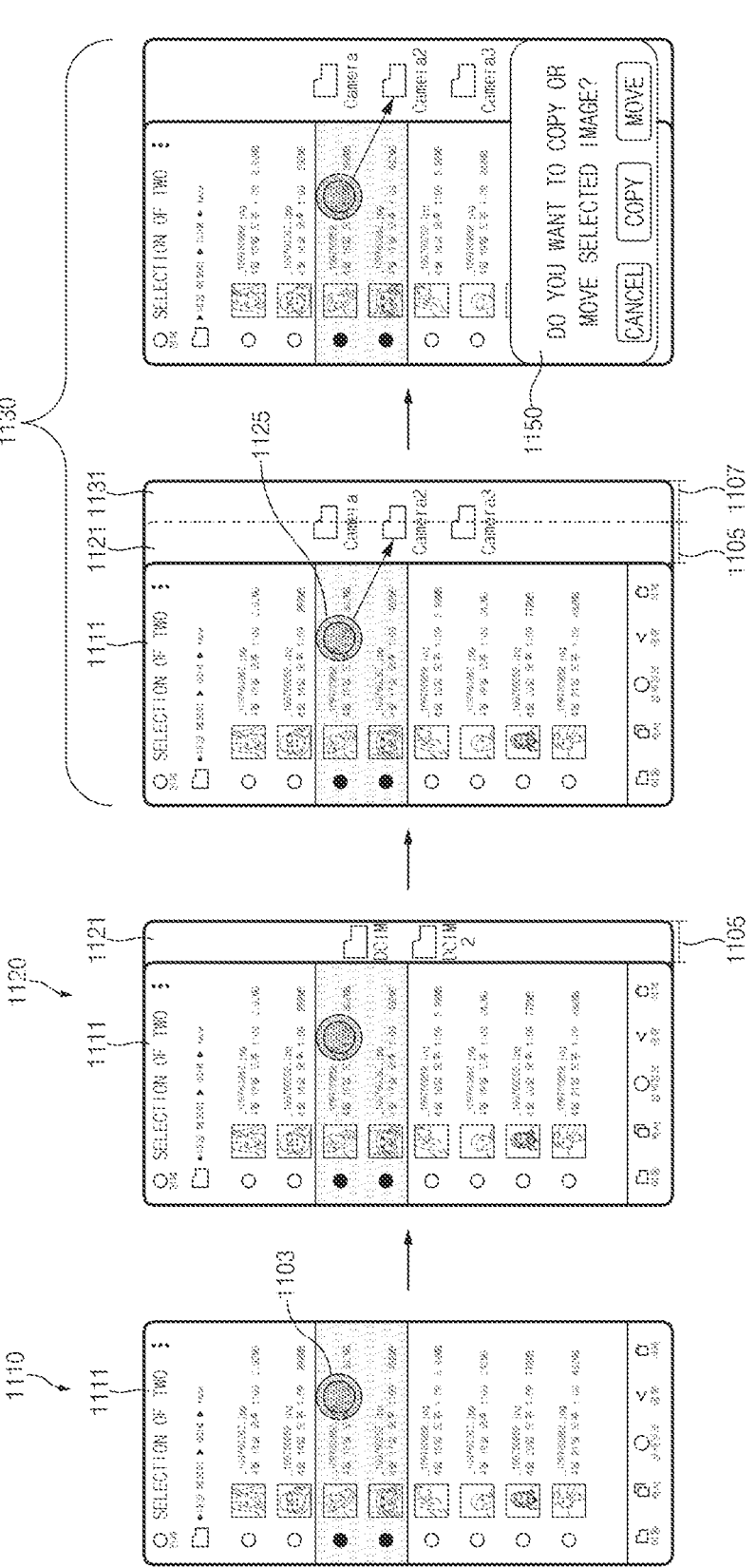
FIG. 11 illustrates an example in which an electronic device moves an object to an area corresponding to a degree at which a display area of a display is exposed to an outside, according to various embodiments.

FIG. 11 illustrates an example in which an electronic device moves an object to an area (e.g., a folder) corresponding to a degree at which a display area of a display is exposed to an outside, according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 10). The display may correspond to a flexible display.

According to an embodiment, the display area of the display of the electronic device may be expanded or reduced stepwise and/or sequentially. Referring to FIG. 11, a first state 1110 in which at least a portion of the display area of the display is drawn into (or accommodated in) the electronic device, and a second state 1120 or 1130 in which at least a portion of the display area is drawn out (or, expanded or exposed) of the electronic device are illustrated. The second states 1120 and 1130 may include a first sub-state 1120 and a second sub-state 1130 that are different from each other and correspond to the degrees at which the display area of the display is exposed to the outside. For convenience of explanation, the first sub-state 1120 and the second sub-state 1130 are illustrated, but these are only examples, and the number of sub-states is not limited to that illustrated in FIG. 11.

According to an embodiment, the display may include a first area 1111 and second areas 1121 and 1131. The first area 1111 may correspond to a display area where the display is visually exposed to the outside in the first state 1110 of the display. The second areas 1121 and 1131 may correspond to a display area exposed to the outside in the second states 1120 and 1130 of the display. For example, when the display corresponds to the first sub-state 1120, the display may have a display area including the first area 1111 and the first sub-area 1121. For example, when the display corresponds to the second sub-state 1130, the display may have a display area that includes the first area 1111, the first sub-area 1121 and the second sub-area 1131.

According to an embodiment, the electronic device may display the first user interface corresponding to the execution screen of a specified application on the first area 1111 in the first state 1110.

In an embodiment, a specified application may be an application including data in a hierarchical structure corresponding to a plurality of levels. In an embodiment, the specified application may be a memo application or a file management application including objects (e.g., folders, files) in a hierarchical structure corresponding to a plurality of levels. In an embodiment, the memo application or the file management application may include a plurality of folders. For example, a memo application or a file management application including a plurality of folders may have a hierarchical structure in which a first folder of an upper level includes a second folder of a lower level. For example, a memo application or a file management application including a plurality of folders may have a hierarchical structure including folders of different levels such that a first folder includes a second folder and the second folder includes a third folder. In this case, folders of different levels may have different paths (or locations) stored in the electronic device (or the memory 130 of FIG. 1 or the memory 630 of FIG. 6A). In addition to the above-described example, the specified application may include at least one of a mail application, a gallery application, a music playback application, and a social network service application, which are operated in a hierarchical structure corresponding to a plurality of levels. Hereinafter, a case in which the specified application is a file management application will be exemplarily described.

According to an embodiment, in the first state 1110, the electronic device may allow the first user interface displayed in the first area 1111 to display an object included in a first specified folder of the file management application. The first user interface may include at least one file. In addition, the first user interface may include a menu and/or text for using a service of the file management application, and/or information (e.g., first path information) corresponding to the first specified folder. For example, the first path information may include information about the location of the first specified folder.

According to an embodiment, the electronic device may receive a user input 1103 for entering an editing mode of an object (e.g., a file). For example, the user input 1103 for entering the editing mode of the object may include a long touch input. In various embodiments, the user input 1103 for entering the editing mode of the object may be received in the second state 1120 or 1130.

According to an embodiment, the electronic device may use a sensor (e.g., the sensor module 176 of FIGS. 1 and 2 or the sensor 620 of FIG. 6A) to recognize that the display area of the display is expanded stepwise or sequentially.

According to an embodiment, the electronic device may use the sensor to recognize that the display is changed from the first state 1110 to the first sub-state 1120. For example, the electronic device may recognize that the display area of the display is drawn out by a first length value 1105 than the display area in the first state 1110. Based on entering the editing mode of an object, the electronic device may display the second user interface on the first sub-area 1121 exposed as the display expands. The second user interface displayed on the first sub-area 1121 in the first sub-state 1120 may indicate a second specified folder corresponding to a higher folder of the first specified folder of the file management application being executed. For example, the second specified folder may be a folder higher by one level than the first specified folder. For example, the second specified folder may include the first specified folder.

According to an embodiment, the electronic device may receive a user input related to an object displayed on a screen, and perform a specified function in response to the received user input. According to an embodiment, the electronic device may receive a user input (not shown) for moving (locating) a file (or an object corresponding to the file) included in the first specified folder to the second specified folder included in the second user interface of the first sub-area 1121. For example, when recognizing that the display location of the file included in the first specified folder has moved to the second specified folder of the first sub-area 1121 based on the user input, the electronic device may move the file to the second specified folder. Alternatively, the electronic device may copy and move the file to the second specified folder of the first sub-area 1121. In an embodiment, the electronic device may move (or copy) the file to the second specified folder based on recognizing that the user input for the file is released on the display location of the second specified folder of the second user interface displayed on the first sub-area 1121. In various embodiments, the electronic device may display a function menu for moving or copying the file based on the received user input.

According to an embodiment (not shown), in the first sub-state 1120, the electronic device may receive a user input other than an area corresponding to the second specified folder displayed on the first sub-area 1121. For example, the second specified folder may include a first specified folder (e.g., DCIM) and another first specified folder (e.g., DCIM2), and the electronic device may obtain the user input through an area except for the first specified folder and the other first specified folder. In an embodiment, when a user input is obtained through an area other than an object (e.g., a folder) included in the second specified folder in the first sub-area 1121, the file may be moved (copied) to the third specified folder including the second specified folder. According to an embodiment, the electronic device may use a sensor to recognize the second sub-state 1130 in which the display area of the display is drawn out more by a second length value 1107 than the display area of the first sub-state 1120. The electronic device may display the third user interface on the first sub-area 1121 and the second sub-area 1131 based on recognizing the second sub-state 1130. The third user interface may display the third specified folder corresponding to a higher folder of the second specified folder of the file management application being executed. For example, the third specified folder may be a folder higher than the second specified folder by one level, and may be a folder higher than the first specified folder by two levels. For example, the third specified folder may include the second specified folder and the first specified folder, and the second specified folder may include the first specified folder.

In an embodiment, the electronic device may display path information corresponding to the changed folder (e.g., the second specified folder and/or the third specified folder) based on the expansion of the display. For example, the electronic device may display the path information of the first specified folder on the first area 1111 in the first state 1110, display the path information of the first specified folder and the second specified folder on the first area 1111 in the first sub-state 1120, and display the path information of the first specified folder and the third specified folder on the first area 1111 in the second sub-state 1130. However, the embodiments are not limited thereto, and the path information related to the changed folder may be displayed on the first sub-area 1121 and/or the second sub-area 1131.

According to an embodiment, the electronic device may receive a user input related to an object, and perform a specified function in response to the received user input. According to an embodiment, the electronic device may receive a user input 1125 for moving a file (or an object corresponding to the file) included in the first specified folder to the third specified folder included in the third user interface. For example, the electronic device may display a function menu 1150 related to the file based on recognizing that the display location of the file included in the first specified folder is moved to the third specified folder of the third user interface displayed on the first sub-area 1121 and the second sub-area 1131 based on the user input 1125. In an embodiment, when another user input (e.g., a long touch) is obtained for a time specified in the selected third specified folder after the user input 1125, the electronic device may display the second specified folder that is a lower level of the third specified folder. For example, when another user input (e.g., a long touch) is obtained for a time specified in the selected third specified folder, the electronic device may change the third user interface displayed on the first sub-area 1121 and the second sub area 1131 to the second user interface.

In an embodiment, the electronic device may display the function menu 1150 based on recognizing that the user input 1125 for a file is released at the display location of the second specified folder of the third user interface displayed on the first sub-area 1121 and the second sub-area 1131. The function menu 1150 may include a first icon for moving a file selected by a user, a second icon for copying and moving a file selected by the user, or a third icon for canceling to not perform a moving and copying function. The electronic device may move or copy and move the file to a third specified folder based on a user input upon the function menu 1150.

In an embodiment, the electronic device may display, to be visually distinguished, a folder which corresponding to the first specified folder of the first area 1111 among objects (or icons, e.g., sub-folders included in the second specified folder or sub-folders included in the third specified folder) displayed on the first sub-area 1121 and/or the second sub-area 1131. For example, in the first sub-state 1120, the electronic device may display a folder (e.g., DCIM) corresponding to the first specified folder and another folder (e.g., DCIM2) included in the second specified folder on the first sub-area 1121. In an embodiment, the electronic device may provide a shadow effect (gray processing) or a highlight effect to a folder (e.g., DCIM) corresponding to the first specified folder displayed on the first area 1111 unlike another folder (e.g., DCIM2) included in the second specified folder.

In an embodiment, the electronic device may determine a user interface displayed on the first sub-area 1121 and/or the second sub-area 1131 based on the number of upper levels of the first specified folder display on the first area 1111 and the maximum expansion distance of the display. For example, when the upper level of the first specified folder is two levels (e.g., the second specified folder and the third specified folder) and the maximum expansion distance of the display is 4 cm, the electronic device may determine (or discriminate) a width of each of the sub-areas 1121 and 1131 based on Equation 3.

$$\text{Width of sub−area} = \frac{\text{Maximum expansion distance}}{\text{Number of upper level}} \quad \text{(Equation 3)}$$

For example, the electronic device may determine that the width of each of the sub-areas 1121 and 1131 is 2 cm. For example, when the first length value 1105 is greater than 0 (zero) and less than 2 cm, the electronic device may display the second user interface corresponding to the second specified folder, and display the third user interface corresponding to the third specified folder when the sum of the first length value 1105 and the second length value 1107 is 2 cm or more and 4 cm or less.

According to an embodiment, as the display is expanded, the electronic device may display folders of different levels corresponding to a degree at which the display area of the display is exposed to an outside, thereby providing an intuitive use experience to a user.

Figure 12:
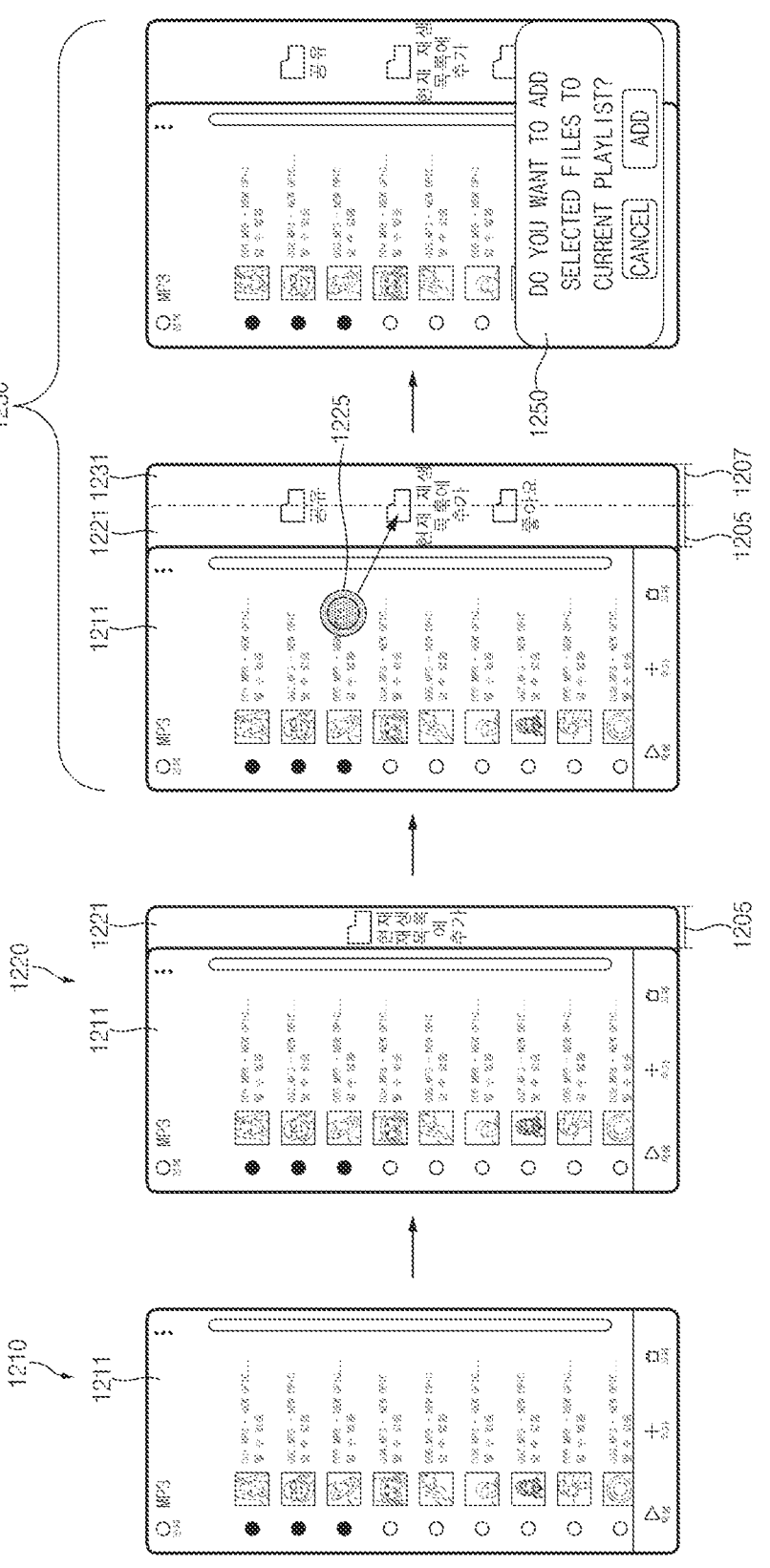
FIG. 12 illustrates an example in which an electronic device displays a function menu of an executing application corresponding to a degree at which a display area of a display is exposed to an outside according to various embodiments.

FIG. 12 illustrates an example in which an electronic device displays a function menu of an executing application corresponding to a degree at which a display area of a display is exposed to an outside according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 11). The display may correspond to a flexible display.

According to an embodiment, the display area of the display of the electronic device may be expanded or reduced stepwise and/or sequentially. Referring to FIG. 12, a first state 1210 in which at least a portion of the display area of the display is drawn into (or accommodated in) the electronic device, and second states 1220 and 1230 in which at least a portion of the display area is drawn out (or, expanded or exposed) of the electronic device are illustrated. The second states 1220 and 1230 may include a first sub-state 1220 and a second sub-state 1230 that are different from each other and correspond to the degrees at which the display area of the display is exposed to the outside. For convenience of explanation, the first sub-state 1220 and the second sub-state 1230 are illustrated, but these are only examples, and the number of sub-states is not limited to that illustrated in FIG. 12.

According to an embodiment, the display may include a first area 1211 and a second area 1221 or 1231. The first area 1211 may correspond to a display area where the display is visually exposed to the outside in the first state 1210 of the display. The second area 1221 or 1231 may correspond to a display area exposed to the outside in the second state 1220 or 1230 of the display. For example, when the display corresponds to the first sub-state 1220, the display may have a display area including the first area 1211 and the first sub-area 1221. For example, when the display corresponds to the second sub-state 1230, the display may have a display area that includes the first area 1211, the first sub-area 1221 and the second sub-area 1231.

According to an embodiment, the electronic device may display the first user interface corresponding to the execution screen of a specified application on the first area 1211 in the first state 1210. For example, the specified application may include at least one of a mail application, a gallery application, a music playback application, and a social network service application. Hereinafter, a case in which the specified application is a music playback application will be exemplarily described According to an embodiment, the electronic device may display the first user interface corresponding to the execution screen of the music playback application on the first area 1211 in the first state 1210. The first user interface may indicate a playable object. The first user interface may include at least one music file.

According to an embodiment, the electronic device may use a sensor (e.g., the sensor module 176 of FIGS. 1 and 2 or the sensor 620 of FIG. 6A) to recognize that the display area of the display is expanded. According to an embodiment, the electronic device may use the sensor to recognize that the display is changed from the first state 1210 to the first sub-state 1220. For example, the electronic device may recognize that the display area of the display is drawn out by a first length value 1205 than the display area in the first state

1210. According to an embodiment, when recognizing that the display area of the display is expanded, the electronic device may enter an editing mode of an object. According to an embodiment, the electronic device may display the second user interface on the first sub-area 1221 exposed as the display expands based on entering the editing mode of the object. The second user interface may include a first function menu of an executing application (e.g., a music playback application). The first function menu may include an additional function corresponding to a current playlist.

According to an embodiment, the electronic device may use a sensor to recognize the second sub-state 1230 in which the display area of the display is drawn out more by a second length value 1207 than the display area of the first sub-state 1220. The electronic device may display the third user interface on the first sub-area 1221 and the second sub-area 1231 based on recognizing the second sub-state 1230. The third user interface may include a second function menu of the executing application. For example, the second function menu may include increased (more) functions than the first function menu of the second user interface. For example, the second function menu may include an additional function (e.g., addition to a current playlist), a share function, and a like function to a current playlist. Functions included in the first function menu and second function menu described above are merely examples and are not limited to interpretation.

According to an embodiment, the electronic device may determine an object (or icon) included in the second user interface and/or the third user interface based on the functions, services and/or types provided in the first user interface (e.g., the user interface provided in the first area 1211). For example, when the first user interface is a function corresponding to the current playlist, as shown, the electronic device may provide an additional function, a sharing function, and/or a like function, and may provide a reproduction setting, sound quality setting, and/or equalizer (EQ) function when the first user interface is a function corresponding to a sound source (or music file) playback screen.

According to an embodiment, the electronic device may receive a user input related to an object and perform a specified function in response to the received user input. According to an embodiment, the electronic device may receive a user input 1225 for moving an object (e.g., a music file) displayed on the first user interface to the first function menu or the second function menu. In an embodiment, the electronic device may recognize that the object's display location is moved to the second function menu of the third user interface displayed in the first sub-area 1221 and the second sub-area 1231 based on the user input 1225. In an embodiment, the electronic device may recognize that the user input 1225 for an object is released at the display location of a specified function (e.g., addition to a current playlist) of the third user interface displayed on the first sub-area 1221 and the second sub-area 1231. According to an embodiment, the electronic device may display a confirmation menu 1250. The confirmation menu 1250 may include an icon (e.g., a cancel icon or an additional icon) for confirming whether a specified function corresponding to the user input 1225 is executed. The electronic device may perform a specified function related to the object based on a user input upon the confirmation menu 1250.

According to an embodiment, the electronic device may determine an object (or icon) of the first function menu and/or the second function menu based on priority information. For example, the electronic device may provide a user interface for selecting functions displayed on the first sub-area 1221 and/or the second sub-area 1231 from among a plurality of functions provided by the music playback application, and may provide the objects (or icons) selected (by the user) in the user interface to the first sub-area 1221 and/or the second sub-area 1231. According to an embodiment, the electronic device may include an object (or icon) of the first function menu and/or the second function menu which is preset, and the object (or icon) selected by the user may increase the corresponding priority information.

According to an embodiment, the electronic device may determine (change) the user interface provided to the first sub-area 1221 and/or the second sub-area 1231 based on a change in the state of the display. For example, when the electronic device is changed from a normal mode (e.g., see FIGS. 3A, 4A and 5A) to an expanded mode (e.g., see FIGS. 3B, 4B and 5B), as shown, the electronic device may display the first function menu and/or the second function menu. As another example, when the electronic device is changed from the expansion mode to the normal mode, the electronic device may provide the object (or icon) on which the user input is performed in the second sub-state 1230 to the second user interface in the first sub-state 1220.

According to an embodiment, as the display is expanded, the electronic device may display different function menus corresponding to a degree at which the display area of the display is exposed to an outside, and may perform a specified function based on a user input. The electronic device may provide the user with an intuitive use experience according to the expansion of the display.

According to an embodiment, the electronic device may provide the first user interface provided in the first area 1211 and a function corresponding to an object (or icon) selected in the first user interface to the second user interface and/or the third user interface, thereby effectively performing a specified function. For example, the electronic device may display an object (or icon) selected in the first user interface and a function corresponding to the object (or icon) on one display, thereby providing an intuitive user experience to the user.

Figure 13A:
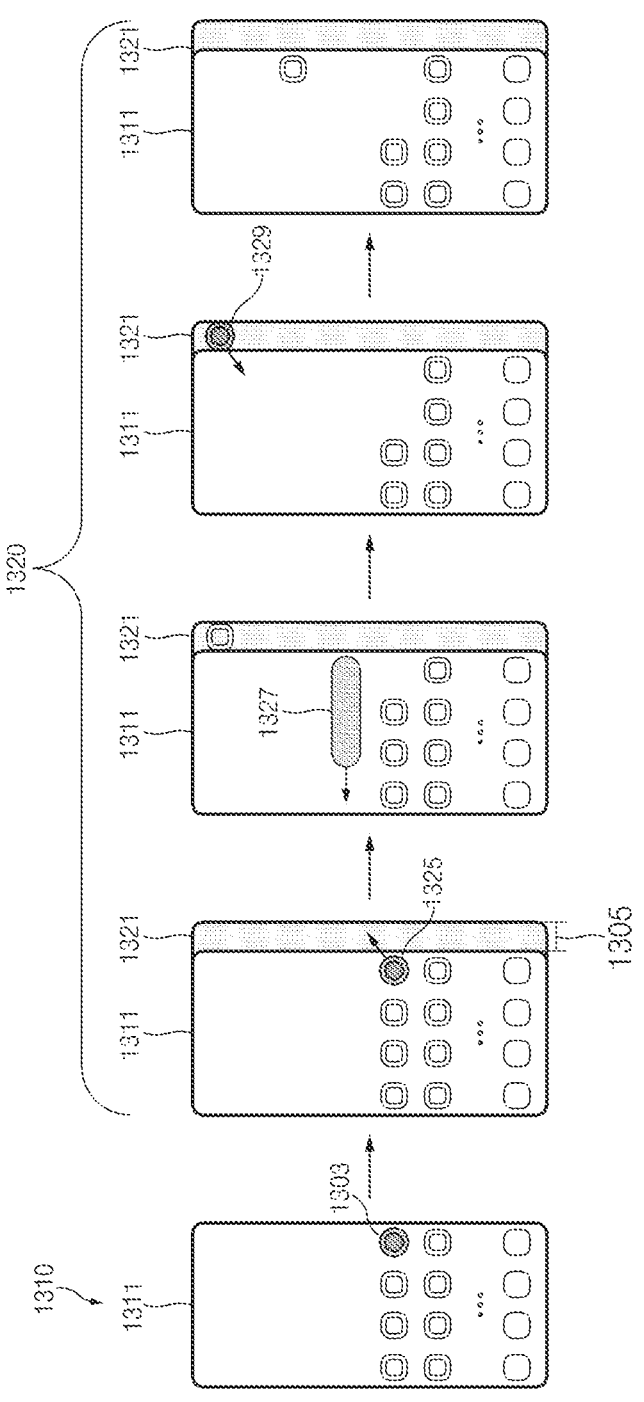
FIG. 13A illustrates an example in which an electronic device provides a temporary storage space when a display area of a display is exposed to an outside according to various embodiments.

FIG. 13A illustrates an example in which an electronic device provides a temporary storage space when a display area of a display is exposed to an outside according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 12). The display may correspond to a flexible display.

According to an embodiment, the display area of the display of the electronic device may be expanded or reduced stepwise and/or sequentially. Referring to FIG. 13A, a first state 1310 in which at least a portion of the display area of the display is drawn into (or accommodated in) the electronic device, and a second state 1320 in which at least a portion of the display area is drawn out (or, expanded or exposed) of the electronic device are illustrated. For example, in the second state 1320, at least a portion of the display area of the display may be maximally expanded. In various examples, the second state 1320 may be an intermediate state between a first state (e.g., a normal mode) in which at least a portion of the display area of the display is reduced and a state in which at least a portion of the display area of the display is maximally expanded.

According to an embodiment, the display may include a first area 1311 and a second area 1321. The first area 1311 may correspond to a display area where the display is visually exposed to the outside in the first state 1310 of the display. The second area 1321 may correspond to a display area exposed to the outside in the second state 1320 of the display. For example, when the display corresponds to the second state 1320, the display may have a display area including the first area 1311 and the second area 1321.

According to an embodiment, the electronic device may display the first user interface corresponding to a home screen or an application drawer screen on the first area 1311 in the first state 1310. The first user interface may include at least one object (or an icon).

According to an embodiment, the electronic device may receive a user input 1303 for entering the editing mode of the screen. For example, the user input 1303 for entering the editing mode of the screen may include a long touch input. In various embodiments, the user input 1303 for entering the editing mode of the screen may be received in the second state 1320.

According to an embodiment, the electronic device may use a sensor (e.g., the sensor module 176 of FIGS. 1 and 2 or the sensor 620 of FIG. 6A) to recognize that the display area of the display is expanded.

According to an embodiment, the electronic device may use the sensor to recognize that the display is changed from the first state 1310 to the second state 1320. For example, the electronic device may recognize that the display area of the display is drawn out by a first length value 1305 than the display area in the first state 1310. Based on entering the editing mode of the screen, the electronic device may display the second user interface on the second area 1321 exposed as the display expands. The second user interface displayed on the second area 1321 may correspond to a temporary storage space of an object (or item).

According to an embodiment, the electronic device may receive a user input related to an object displayed on a screen, and perform a specified function in response to the received user input. According to an embodiment, the electronic device may receive a user input 1325 related to an object. For example, the electronic device may receive the user input 1325 for moving an object displayed on the screen to the second user interface corresponding to the temporary storage space. For example, the user input may include a drag input.

According to an embodiment, the electronic device may move the object to the second user interface corresponding to the temporary storage space of the object based on the user input 1325 related to the object. In an embodiment, the electronic device may temporarily store the object on the second user interface. For example, in the editing mode of the screen, the electronic device may maintain a state in which the object (or icon) is located on the second user interface. In the editing mode of the screen, the state in which the object is located on the second user interface in the editing mode of the screen may correspond to a state in which the object is temporarily stored in a temporary storage space (e.g., the second user interface).

According to an embodiment, in a state in which the object is located on the second user interface, the electronic device may receive a user input 1327 for determining (or selecting) a specified page among a plurality of pages of a home screen or an application drawer screen. In an embodiment, the user input 1327 may be a swipe input for changing a page of a home screen or a page of an application drawer screen. For example, the page may be changed according to the user input 1327.

According to an embodiment, the electronic device may receive a user input 1329 for locating an object on the second user interface on a specified page of a home screen or an application drawer screen. In an embodiment, the electronic device may display the object to be located at an empty location on a specified page of the home screen or the application drawer screen based on the user input 1329.

According to an embodiment, the electronic device may determine the type of an object that can be moved (or stored) in the second area 1321 according to the state in which the second state 1320 is an intermediate state or a fully expanded state. For example, the second state 1320 may include a first sub-state corresponding to a first sub-area (e.g., the first sub-area 1021 of FIG. 10) or a second sub-state corresponding to a first sub-area and a second sub-area (e.g., the second sub-area 1031 of FIG. 10), and the electronic device may determine the type of an object moved to (or stored in) a temporary storage space (e.g., the second user interface) based on the first sub-state or the second sub-state. For example, in the first sub-state, the electronic device may locate the object stored in the memory (e.g., the memory 130 of FIG. 1) of the electronic device on the second user interface, and in the second sub-state, the electronic device may locate the object stored in the memory of the electronic device and/or an external electronic device (e.g., the electronic device 102, the electronic device 104 or the server 108 of FIG. 1) on the second user interface. According to an embodiment, it will be understood by those skilled in the art that a network between the electronic device and the external electronic device is formed by using a communication module to store an object of the external electronic device.

According to an embodiment, the electronic device may determine the number of temporary storage spaces (e.g., the second user interface) according to a state in which the second state 1320 is an intermediate state or a maximum expanded state. For example, the second state 1320 may include a first sub-state corresponding to a first sub-area (e.g., the first sub-area 1021 of FIG. 10) or a second sub-state corresponding to a first sub-area and a second sub-area (e.g., the second sub-area 1031 of FIG. 10), and the electronic device may determine the number of temporary storage spaces (e.g., the second user interface) based on the first sub-state or the second sub-state. For example, in the first sub-state, the electronic device may provide one temporary storage space, and in the second sub-state, the electronic device may provide a plurality of temporary storage spaces. According to an embodiment, in the second sub-state, the third user interface providing a plurality of temporary storage spaces may be configured in various manners. For example, the electronic device may provide a temporary storage space by dividing the second area 1321 vertically or horizontally, but the embodiment is not limited thereto.

Figure 13B:
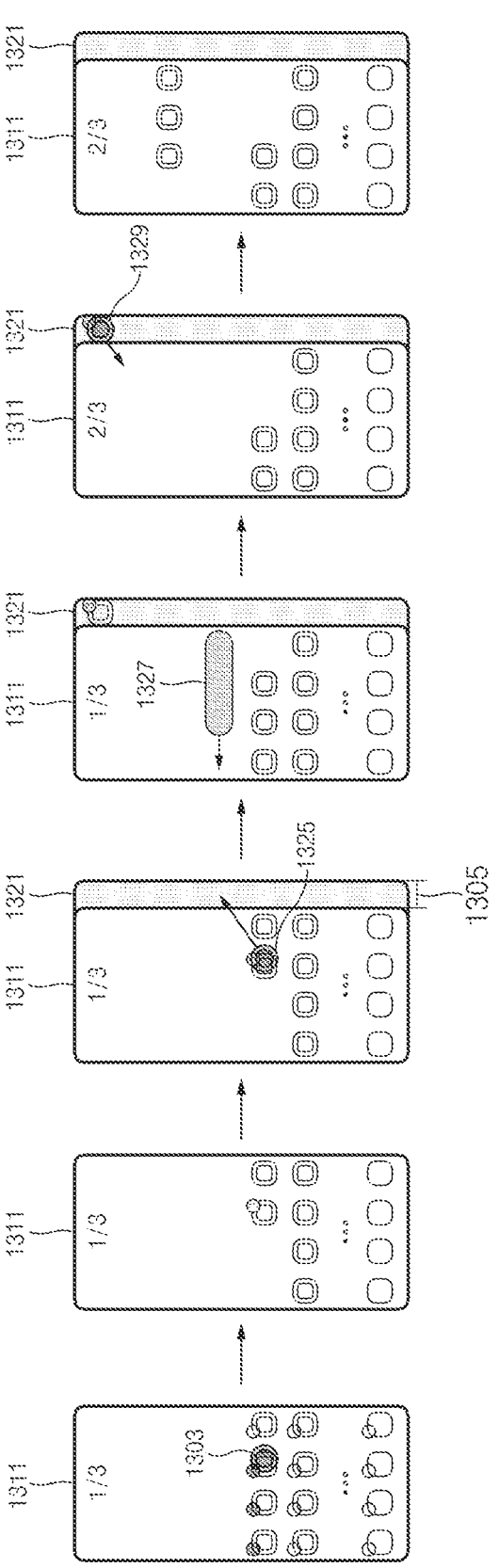
FIG. 13B illustrates an example in which an electronic device provides a temporary storage space when a display area of a display is exposed to an outside according to various embodiments.

FIG. 13B illustrates an example in which an electronic device provides a temporary storage space when a display area of a display is exposed to an outside according to various embodiments.

FIG. 13B is the same as or similar to that described with reference to FIG. 13A except that the electronic device moves a plurality of objects to the second user interface corresponding to the temporary storage space of the object, and thus redundant description will be omitted. According to an embodiment, the electronic device may provide an intuitive temporary storage space to the user by displaying a user interface for temporarily storing an object in an area where the display area of the display is exposed to an outside as the display expands.

In an embodiment, the electronic device may provide a user interface corresponding to different functions (or service) based on the expanded area of the display. For example, in the first sub-state and/or the second sub-state, the electronic device may display the second user interface providing a path and/or a menu (e.g., refer to FIGS. 11 and 12) related to an object, and display the third user interface providing a temporary storage space (e.g., refer to FIGS. 13A and 13B) in a fully expanded state (e.g., a state including the first sub-area, the second sub-area and the third sub-area). According to another embodiment, in the fully expanded state, the electronic device may display the second user interface providing a path and/or a menu related to an object on the first sub-area and the second sub-area, and display the third user interface providing a temporary storage space on the third sub-area (e.g., an area excluding the first sub-area and the second sub-area from the maximum expansion area).

Figure 14:
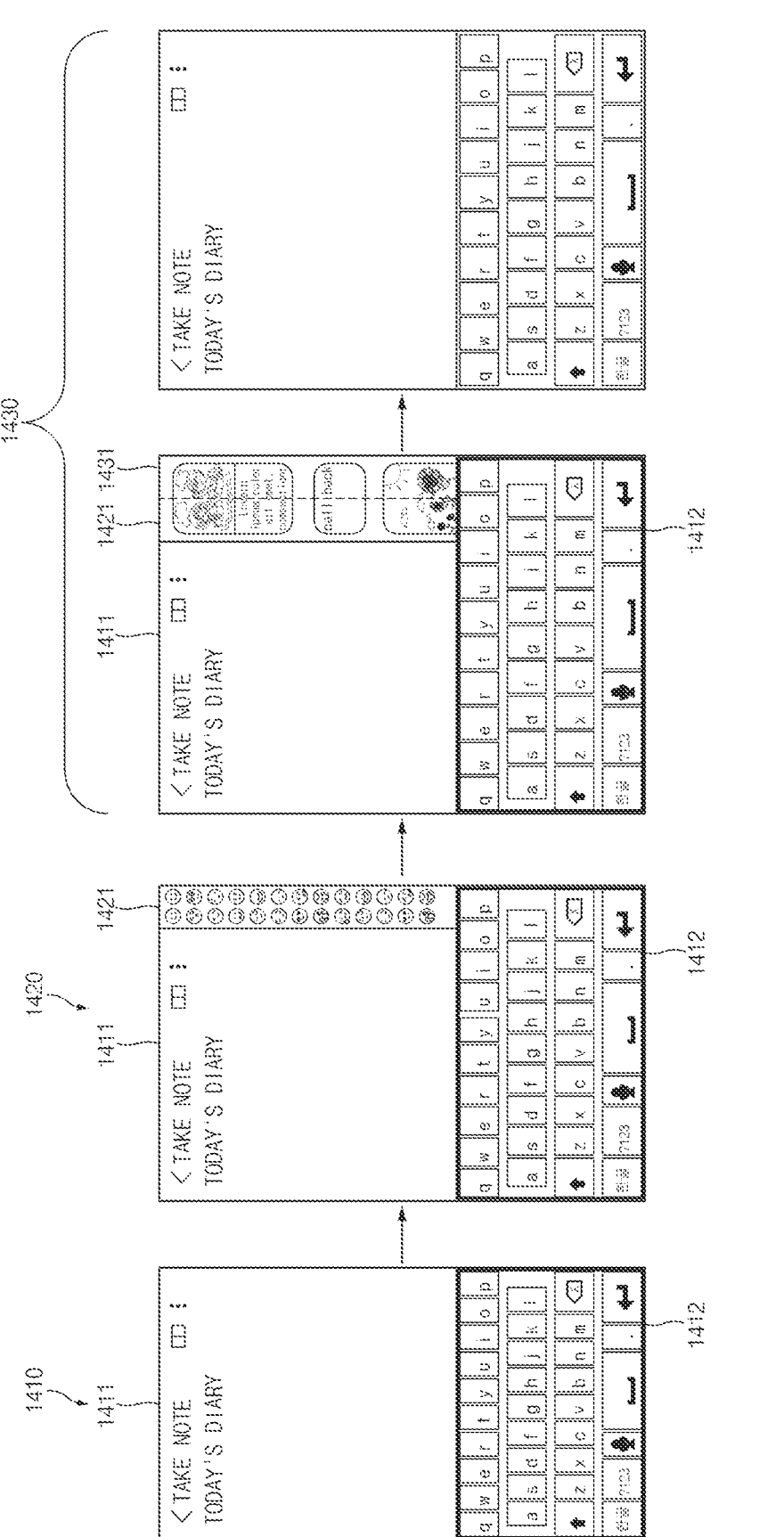
FIG. 14 illustrates an example in which an electronic device displays various user interfaces corresponding to a degree at which a display area of a display is exposed to an outside according to various embodiments.

FIG. 14 illustrates an example in which an electronic device displays various user interfaces corresponding to a degree at which a display area of a display is exposed to an outside according to various embodiments.

According to an embodiment, the electronic device (e.g., the electronic device 101 of FIG. 1 or the electronic device 601 of FIG. 6A) may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 13B). The display may correspond to a flexible display.

According to an embodiment, the display area of the display of the electronic device may be expanded or reduced stepwise and/or sequentially. Referring to FIG. 14, a first state 1410 in which at least a portion of the display area of the display is drawn into (or accommodated in) the electronic device, and second states 1420 and 1430 in which at least a portion of the display area is drawn out (or, expanded or exposed) of the electronic device are illustrated. The second states 1420 and 1430 may include the first sub-state 1420 and the second sub-state 1430 that are different from each other and correspond to the degree at which the display area of the display is exposed to the outside. For convenience of explanation, the first sub-state 1420 and the second sub-state 1430 are illustrated, but these are only examples, and the number of sub-states is not limited to that illustrated in FIG. 14.

According to an embodiment, the display may include a first area 1411 and a second area 1421 or 1431. The first area 1411 may correspond to a display area where the display is visually exposed to the outside in the first state 1410 of the display. The second areas 1421 and 1431 may correspond to a display area exposed to the outside in the second states 1420 and 1430 of the display. For example, when the display corresponds to the first sub-state 1420, the display may have a display area including the first area 1411 and the first sub-area 1421. For example, when the display corresponds to the second sub-state 1430, the display may have a display area that includes the first area 1411, the first sub-area 1421 and the second sub-area 1431.

According to an embodiment, the electronic device may display the first user interface corresponding to the execution screen of a specified application on the first area 1411 in the first state 1410.

In an embodiment, the specified application may receive data (e.g., letters, numbers, emoticons, and/or data stored in a clipboard) from a user by using an input module (e.g., the input module 150 of FIG. 1), and may be an application for displaying the received data on the display. According to an embodiment, the specified application may be an application that activates an input interface 1412 that receives data by using a keyboard (e.g., a physical keyboard or a soft input panel). For example, the specified application may include a memo application and/or a social network service application.

According to an embodiment, in the first state 1410, the electronic device may display the first user interface and the input interface 1412 corresponding to the execution screen of the specified application. For example, the input interface 1412 may include an interface for inputting characters and/or numbers. For example, the first user interface may include an object (e.g., a cursor) for receiving data from the user.

According to an embodiment, the electronic device may use a sensor (e.g., the sensor module 176 of FIGS. 1 and 2 or the sensor 620 of FIG. 6A) to recognize that the display area of the display is expanded stepwise or sequentially. According to an embodiment, the electronic device may use the sensor to recognize that the display is changed from the first state 1410 to the first sub-state 1420.

According to an embodiment, when recognizing that the display area of the display is expanded, the electronic device may display the second user interface on the first sub-area 1421 exposed as the display expands. In an embodiment, the second user interface may include an interface for inputting an object of the first specified type (e.g., an interface for inputting an emoticon) different from the input interface 1412. According to an embodiment, the electronic device may not receive an additional user input for switching the input interface 1412 to the second user interface. The electronic device may provide an intuitive use experience to the user by displaying the second user interface on the first sub-area 1421 while maintaining the input interface 1412 in an activated state.

According to another embodiment, when the electronic device is changed into the first sub-state 1420, the electronic device may display the second user interface on the first sub-area 1421 and the expanded area (e.g., the expanded input interface 1412 area in the first sub-state 1420) while maintaining the shape (or size) of the input interface 1412 in the first state 1410. In addition, according to another embodiment, the electronic device may provide a function (or menu) corresponding to the first specified type of object displayed on the second user interface in the expanded area. For example, the electronic device may display the first specified type of object on the first sub-area 1421, and display the first specified type of object (e.g., history) having a history of use through a user input or a search function menu on the expanded area.

According to an embodiment, the electronic device may use a sensor to recognize the second sub-state 1430 in which the display area of the display is drawn out more than the display area of the first sub-state 1420. The electronic device may display the third user interface on the first sub-area 1421 and the second sub-area 1431 based on recognizing the second sub-state 1430. In an embodiment, the third user interface may include an interface (e.g., an interface for inputting data stored in a clipboard) for inputting a second specified type of object different from the input interface 1412. For example, the data stored in the clipboard may include at least one of images, letters, numbers, and/or emoticons temporarily stored in a memory through a copy and/or cut function by a user. According to an embodiment, the electronic device may not receive any additional user inputs for switching the input interface 1412 to the third user interface. The electronic device may provide the user with an intuitive use experience through the third user interface in the first sub-area 1421 and the second sub-area 1431 while maintaining the input interface 1412 in an activated state.

In an embodiment, the electronic device may end displaying the third user interface. For example, the electronic device may terminate the third user interface based on recognizing that the display maintains the fully expanded state for a specified time. As another example, the electronic device may end the third user interface based on receiving a user input (e.g., a short touch) for ending the third user interface from the user in a state in which the display is fully expanded. As another example, the electronic device may display the second user interface and the third user interface together in a state in which the display is fully expanded. For example, in a state in which the display is maximally expanded, the electronic device may include the first sub-area 1421, the second sub-area 1431 and the third sub-area (e.g., an area excluding the first sub-area and the second sub-area from the maximum expanded area), display the third user interface on the first sub-area 1421 and the second sub-area 1431, and display the second user interface on the third sub-area.

According to an embodiment, an electronic device (e.g., the electronic device 101 of FIG. 1 or the electronic device 601 of FIG. 6A) may include a housing (e.g., at least one of the first housing 310 or the second housing 320 of FIGS. 3A and 3B or the third housing 420 of FIGS. 4A and 4B, or the housing 605 of FIG. 6A), a flexible display (e.g., the display module 160 of FIG. 1, the display 210 of FIGS. 2 and 3A and 3B, the display of FIGS. 5A and 5B, the display 610 of FIG. 6A, or the display of FIGS. 7A and 7B and 8 to 14) having a first state in which at least a portion of a display area is drawn into the housing and a second state in which the at least a portion of the display area is drawn out of the housing as the flexible display is deformed or moved, a sensor (e.g., the sensor module 176 of FIGS. 1 and 2 or the sensor 620 of FIG. 6A), a memory (e.g., the memory 130 of FIG. 1 or the memory 630 in FIG. 6A), and a processor (e.g., the processor 120 of FIG. 1 or the processor 640 of FIG. 6A) operatively coupled to the display, the sensor and the memory. According to an embodiment, the memory may store one or more instructions which, when executed, cause the processor to display a first user interface (e.g., the first user interface of FIG. 7A, 7B, 8, 9, 11, 12, 13A, 13B, or 14) including an object on the display when the display is in the first state, identify a degree at which the at least a portion of the display area of the display is drawn out of the housing by using the sensor, display at least one user interface (e.g., the second to fourth user interfaces of FIGS. 7A and 7B, the second and third user interfaces of FIG. 8, the second to fourth user interfaces of FIG. 9, and the first to third user interface of FIG. 10, the second and third user interfaces of FIG. 11, the second and third user interfaces of FIG. 12, the second user interface of FIGS. 13A and 13B, the second and third user interface of FIG. 14) that is distinguished based on the identified degree in the at least a portion of the display area so as to be distinguished from each other when the display is in the second state, and perform a specified function related to the object in response to a user input related to the object.

According to an embodiment, the instructions may cause the processor to sequentially display the at least one user interface on the at least a portion of the display area based on the identified degree as the display changes from the first state to the second state.

According to an embodiment, the instructions may cause the processor to sequentially display the at least one user interface corresponding to a folder of a different level on the at least a portion of the display area based on the identified degree as the display changes from the first state to the second state.

According to an embodiment, the at least a portion of the display areas may include a first sub-area and a second sub-area different from the first sub-area, distinguished based on the identified degree, the at least one user interface may include a second user interface and a third user interface, and the instructions may cause the processor to display the second user interface on the first sub-area based on determining that the at least a portion of the display area is drawn out by a first length value, and display the third user interface on the second sub-area based on determining that the at least a portion of the display area is drawn out by a second length value.

According to an embodiment, the instructions may cause the processor to switch from the first user interface to the second user interface with a specified effect based on determining that the user input related to the object is placed on the second user interface; and switch from the second user interface to the third user interface with a specified effect based on a determining that the user input related to the object is placed on the third user interface.

According to an embodiment, the first user interface, the second user interface and the third user interface respectively correspond to different pages of a screen.

The instructions cause the processor to recognize that the user input related to the object is placed on one of the second user interface or the third user interface, recognize that the user input related to the object is released from one of the second user interface or the third user interface, and perform a specified function of locating the object on a specified page corresponding to the user interface in which the user input related to the object is released among the pages, based on recognizing that the user input related to the object is released.

According to an embodiment, the instructions may cause the processor to execute a specified application hierarchically including a plurality of folders having different levels, recognize that a user input related to the object and received on the first user interface corresponding to a first folder among the plurality of folders is located on the second user interface corresponding to a second folder among the plurality of folders, recognize that the user input related to the object is released from the second user interface, and perform a specified function of moving or copying the object to the second folder based on recognizing that the user input related to the object is released from the second user interface, and the second folder may include the first folder.

According to an embodiment, the second user interface may correspond to an interface for inputting a first specified type of object, the third user interface may correspond to an interface for inputting a second specified type of object, and the instructions may cause the processor to allow the display to display an input interface in the first state, and display the second user interface or the third user interface based on the identified degree while maintaining the input interface.

According to an embodiment, the instructions may cause the processor to recognize that a user input related to the object is located in one of the second user interface or the third user interface, and locate the object on a user interface in which the user input related to the object is located based on the recognition.

According to an embodiment, the instructions may cause the processor to recognize a user input received at the first user interface while the object is located in a user interface in which the user input related to the object is located, determine a specified page among a plurality of pages based on the recognized user input, and perform the specified function of locating the object onto the specified page based on receiving a user input for locating the object onto the specified page.

FIG. 15 is a flowchart illustrating a method of operating an electronic device according to various embodiments.

Hereinafter, it may be understood that operations described as being performed by an electronic device (e.g., the electronic device 101 of FIG. 1 or the electronic device 601 of FIG. 6A) are performed by a processor (e.g., the processor 120 of FIG. 1 or the processor 640 of FIG. 6A).

According to an embodiment, the electronic device may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 14). The display may correspond to a flexible display.

According to an embodiment, the display may has a first state in which at least a portion of a display area is drawn into a housing (e.g., at least one of the first housing 310 and the second housing 320 of FIGS. 3A and 3B, or the third housing 420 of FIGS. 4A and 4B, or the housing 605 of FIG. 6A). According to an embodiment, the display may have a second state in which the at least a portion of the display area is drawn out (or expanded or exposed) of the housing. According to an embodiment, in the first state, the display may have a first area corresponding to the display area exposed to the outside. A display area exposed to the outside may increase in the second state of the display. For example, the display may have the first area and at least a portion of the display area in the second state. For example, at least a portion of the display area exposed to the outside in the second state of the display may correspond to the second area.

According to an embodiment, in operation 1510, the electronic device may display a first user interface including an object on the display in the first state. In an embodiment, the electronic device may display the first user interface including an object on the first area exposed to an outside among the display areas of the display in the first state.

According to an embodiment, in operation 1530, the electronic device may identify a degree at which the at least a portion of the display area of the display is drawn out of the housing by using the sensor (e.g., the sensor module 176 of FIGS. 1 and 2 or the sensor 620 of FIG. 6A).

According to an embodiment, in operation 1550, the electronic device may display at least one user interface that is distinguished from the first user interface based on the identified degree in the at least a portion of the display area so as to be distinguished from each other when the display is in the second state. According to an embodiment, the electronic device may display, on the at least a portion of the display area, a second user interface and/or a third user interface, which are distinguished from each other according to the degree at which the at least a portion of the display area is drawn out of the housing in the second state of the display.

According to an embodiment, in operation 1570, the electronic device may perform a specified function related to the object in response to a user input related to the object.

In an embodiment, the electronic device may recognize that the user input related to the object is located at one of the second user interface or the third user interface. For example, the electronic device may perform a specified function of locating the object on a specified page of a home screen or an application drawer screen corresponding to one of the second user interface or the third user interface. For example, the electronic device may perform a specified function of moving or copying the object to the specified folder of a path corresponding to the user input related to the object. For example, the electronic device may perform a specified function of temporarily storing the object on the second user interface or the third user interface. For example, the electronic device may perform a function of displaying an interface for inputting a specified type of object corresponding to one of the second user interface or the third user interface. According to various embodiments, as the display expands, the electronic device may perform a specified function corresponding to the degree at which the display area of the display is exposed to the outside, thereby providing an intuitive user experience.

Figure 16:
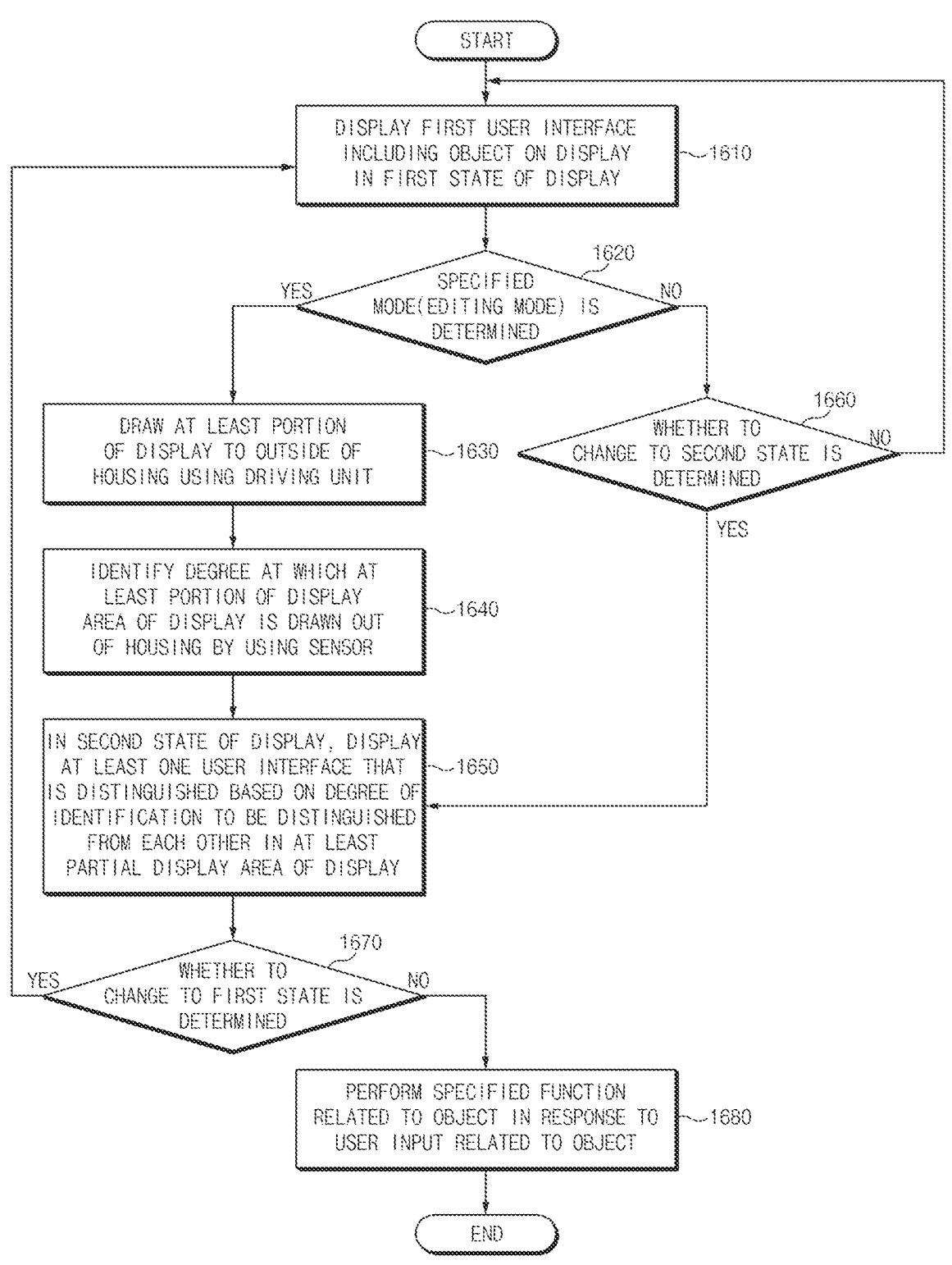
FIG. 16 is a flowchart illustrating a method of operating an electronic device according to various embodiments.

FIG. 16 is a flowchart illustrating a method of operating an electronic device according to various embodiments.

Hereinafter, it may be understood that operations described as being performed by an electronic device (e.g., the electronic device 101 of FIG. 1 or the electronic device 601 of FIG. 6A) are performed by a processor (e.g., the processor 120 of FIG. 1 or the processor 640 of FIG. 6A.

According to an embodiment, the electronic device may include a display (e.g., the display module 160 of FIG. 1, the display 210 of FIGS. 2 and 3A and 3B, the display of FIGS. 5A and 5B, the display 610 of FIG. 6A, or the display of FIGS. 7A, 7B and 8 to 14). The display may correspond to a flexible display.

According to an embodiment, the display may have a first state in which at least a portion of a display area is drawn into a housing (e.g., at least one of the first housing 310 and the second housing 320 of FIGS. 3A and 3B, or the third housing 420 of FIGS. 4A and 4B, or the housing 605 of FIG. 6A). According to an embodiment, the display may have a second state in which at least a portion of the display area is drawn out (or expanded or exposed) of the housing. According to an embodiment, in the first state, the display may have a first area corresponding to the display area exposed to the outside. A display area exposed to the outside may increase in the second state of the display. For example, the display may have the first area and at least a portion of the display area in the second state. For example, at least a portion of the display area exposed to the outside in the second state of the display may correspond to the second area.

According to an embodiment, in operation 1610, the electronic device may display a first user interface including an object on the display in the first state. In an embodiment, the electronic device may display the first user interface including an object on the first area exposed to an outside among the display areas of the display in the first state.

According to an embodiment, in operation 1620, the electronic device may determine whether it is a specified mode (e.g., an editing mode). For example, the electronic device may receive a user input through a display or obtain a specified command by using a communication module. The electronic device may determine whether the electronic device changes to a specified mode (e.g., an editing mode)

based on a user input and/or a specified command. According to an embodiment, when the electronic device is in a specified mode, the electronic device may perform operation 1630, and when not, the electronic device may perform operation 1660.

According to an embodiment, in operation 1630, the electronic device may draw at least a partial area of the display to the outside of the housing by using a driving unit. For example, based on the change of the electronic device to the specified mode, the electronic device may change the display from the first state to the second state (or intermediate state) by using the driving unit. According to an embodiment, the electronic device may automatically perform an operation of changing from the first state to the second state (or intermediate state). However, the embodiment is not limited thereto, and the electronic device may display a user interface (e.g., a pop-up menu) for confirming a change to the second state (or intermediate state) through the display, and may change to the second state (or intermediate state) based on a user input obtained through the displayed pop-up menu.

According to an embodiment, in operation 1640, the electronic device may identify a degree at which the at least a portion of the display area of the display is drawn out of the housing by using the sensor (e.g., the sensor module 176 of FIGS. 1 and 2 or the sensor 620 of FIG. 6A).

According to an embodiment, in operation 1650, the electronic device may display at least one user interface that is distinguished from the first user interface based on the identified degree in the at least a portion of the display area of the display so as to be distinguished from each other when the display is in the second state. According to an embodiment, the electronic device may display, on the at least a portion of the display area, a second user interface and/or a third user interface, which are distinguished from each other according to the degree at which the at least a portion of the display area is drawn out of the housing in the second state of the display.

According to an embodiment, in operation 1670, the electronic device may determine whether the display changes from the second state (or intermediate state) to the first state. For example, while displaying the second user interface and/or the third user interface, which are distinguished from each other according to the degree at which the at least partial display area is drawn out of the housing, on the at least partial display area, the electronic device may change the display to the first state based on a user input and/or the specified command. For example, the electronic device may recognize a change in the state of the display based on a user input detected by using a sensor (e.g., the sensor module 176 of FIGS. 1 and 2 or the sensor 620 of FIG. 6A). For example, the electronic device may change the state of the display based on data included in the specified command and determine whether the state of the display is changed to the first state.

According to an embodiment, when the display is changed from the second state (or intermediate state) to the first state, the electronic device may perform operation 1610, and when the display does not change to the first state, the electronic device may perform operation 1680. For example, when the display is changed to the first state, the electronic device may display the first user interface including an object in the first area exposed to the outside in the first state. In addition, when the display enters an intermediate state during an operation in which the display is changed from the second state to the first state, the electronic device may not display the user interface corresponding to the intermediate state on at least a portion (e.g., an area other than the first area among the areas visually exposed to the outside) of the display area of the display.

According to an embodiment, in operation 1680, the electronic device may perform a specified function related to the object in response to a user input related to the object. The detailed operation may be the same/similar to operation 1570 of FIG. 15.

According to an embodiment, in operation 1660, the electronic device may determine whether the display is changed from the first state to the second state (or intermediate state). For example, when the electronic device is not in a specified mode (e.g., the editing mode), the electronic device may determine whether the display is changed to the second state (or intermediate state) based on the sensor and/or the specified command. According to an embodiment, the electronic device may perform operation 1650 when the display is changed to the second state (or intermediate state), and perform operation 1610 when the display does not change to the second state (or intermediate state). For example, when the electronic device performs operation 1610 again, it may mean that the electronic device maintains the operation of displaying the first user interface.

According to an embodiment, the electronic device may include another mode in addition to the editing mode described as the specified mode. For example, the specified mode may include a mode in which a function (or service) corresponding to operation 1680 is provided. For example, a level mode (e.g., refer to FIG. 11), a menu mode (e.g., refer to FIG. 12), a temporary storage mode (e.g., refer to FIGS. 13A and 13B), and/or a mode (e.g., refer to FIG. 14) in which a specified type of object is displayed may be included. In addition, as another example, the specified mode may include a mode in which a specified object (or specified icon) is selected. For example, the electronic device may display the specified object (or specified icon) included in the first user interface, and when the specified object is selected, the electronic device may determine the change (request) to the specified mode.

According to an embodiment of the disclosure, a method of operating an electronic device which includes display including a flexible display (e.g., the display module 160 of FIG. 1, the display 210 of FIGS. 2 and 3A and 3B, the display of FIGS. 5A and 5B, the display 610 of FIG. 6A, or the display of FIGS. 7A and 7B and 8 to 14) having a first state in which at least a portion of a display area is drawn into a housing and a second state in which the at least a portion of the display area is drawn out of the housing may include an operation of displaying a first user interface (e.g., the first user interface of FIG. 7A, 7B, 8, 9, 11, 12, 13A, 13B, or 14) including an object on the display when the display is in the first state, identifying a degree at which the at least a portion of the display area of the display is drawn out of the housing by using a sensor (e.g., the sensor module 176 of FIGS. 1 and 2 or the sensor 620 of FIG. 6A), displaying at least one user interface (e.g., the second to fourth user interfaces of FIGS. 7A and 7B, the second and third user interfaces of FIG. 8, the second to fourth user interfaces of FIG. 9, and the first to third user interface of FIG. 10, the second and third user interfaces of FIG. 11, the second and third user interfaces of FIG. 12, the second user interface of FIGS. 13A and 13B, the second and third user interfaces of FIG. 14) that is distinguished from the first user interface based on the identified degree in the at least a portion of the display area so as to be distinguished from each other when the display is in the second state, and performing a specified function related to the object in response to a user input related to the object.

According to an embodiment, the displaying of the at least one user interface may include sequentially displaying the at least one user interface on the at least a portion of the display area based on the identified degree as the display changes from the first state to the second state.

According to an embodiment, the displaying of the at least one user interface may include sequentially displaying the at least one user interface corresponding to a folder of a different level on the at least a portion of the display area based on the identified degree as the display changes from the first state to the second state.

According to an embodiment, the at least a portion of the display areas may include a first sub-area and a second sub-area different from the first sub-area, distinguished based on the identified degree, and the at least one user interface may include a second user interface and a third user interface, where the displaying of the at least one user interface may include displaying the second user interface on the first sub-area based on determining that the at least a portion of the display area is drawn out by a first length value, and displaying the third user interface on the second sub area based on determining that the at least a portion of the display area is drawn out by a second length value.

According to an embodiment, the first user interface, the second user interface and the third user interface may correspond to different pages of a screen, respectively and the performing of the specified function related to the object may include recognizing that the user input related to the object is placed on one of the second user interface or the third user interface, recognizing that the user input related to the object is released from one of the second user interface or the third user interface, and performing a specified function of locating the object on a specified page corresponding to the user interface in which the user input related to the object is released among the pages, based on recognizing that the user input related to the object is released.

According to an embodiment, the method of operating an electronic device may further include executing a specified application hierarchically including a plurality of folders having different levels, where the performing of the specified function related to the object may include recognizing that a user input related to the object and received on the first user interface corresponding to a first folder among the plurality of folders is located on the second user interface corresponding to a second folder among the plurality of folders, recognizing that user input related to the object is released from the second user interface, and performing a specified function of moving or copying the object to the second folder based on recognizing that the user input related to the object is released from the second user interface, and the second folder may include the first folder.

According to an embodiment of the disclosure, a method of operating an electronic device which includes a display including a flexible display (e.g., the display module 160 of FIG. 1, the display 210 of FIGS. 2 and 3A and 3B, the display of FIGS. 5A and 5B, the display 610 of FIG. 6A, or the display of FIGS. 7A and 7B and 8 to 14) having a first state in which at least a portion of a display area is drawn into a housing and a second state in which the at least a portion of the display area is drawn out of the housing may include displaying a first user interface including an object on the display when the display is in the first state, determining whether the electronic device is in a specified mode for editing an item displayed on the display, changing the display to the second state based on that the electronic device is in the specified mode, identifying a degree at which a display area of the display is drawn out of the housing when the display is in the second state, and displaying at least one user interface that is distinguished from the first user interface based on the identified degree on at least a portion of a display area of the display in the second state to be distinguished from each other.

According to an embodiment, the method of operation an electronic device may further include determining whether the display changes to the first state, and performing a specified function related to the object on the at least one user interface in response to a user input related to the object based on the display not being changed to the first state.

According to an embodiment, the specified function may include at least one of a function of locating the object on a specified page of a home screen or an application drawer screen, a function of moving or copying the object to a specified folder, or a function of temporarily storing the object.

According to an embodiment, the method of operation an electronic device may further include recognizing that a user input related to the object is located onto the at least one user interface, where the method may include at least one of locating the object to the specified page corresponding to a user interface in which the user input is located, or moving or copying the object to the specified folder corresponding to a path in which the user input is located.

An electronic device according to various embodiments of the disclosure may include various forms of devices. For example, the electronic device may include at least one of a portable communication device (e.g., a smartphone), a computer device, a portable multimedia device, a portable medical device, a camera, a wearable device, or a home electronic appliance. The electronic device according to an embodiment of this disclosure may not be limited to the above-described devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B." "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block." "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
  a housing including a first housing part and a second housing part configured to move with respect to the first housing part;

a flexible display having a display area including a first area and a second area, wherein the first area of the flexible display is exposed outside of the housing in a retracted state in which at least a portion of the display area is drawn into the housing, and the first area and the second area are exposed outside of the housing in an expanded state in which the at least a portion of the display area is drawn out of the housing;

a memory; and at least one processor operatively coupled to the flexible display and the memory, wherein the memory stores one or more instructions which, when executed by the at least one processor individually or collectively, cause the electronic device to:

display a first user interface corresponding to a first page of a home screen including an object on the first area of the flexible display in the retracted state, wherein the object comprises an icon representing an application, a folder, or a file;

receive a first user input including a long touch input to select the object;

in response to receiving the first user input, change a state of the flexible display from the retracted state to the expanded state to expose the second area to the outside of the housing and display a second user interface corresponding to a second page of the home screen on the exposed second area;

receive a second user input including a drag input linked to the long touch input to move the object from the first user interface on the first area to the second user interface on the second area; and in response to receiving the second user input, move the object to the second page of the home screen, wherein the drag input crosses from the first user interface to the second user interface.

2. The electronic device of claim 1, wherein the instructions cause the electronic device to:

identify a degree at which the at least a portion of the display area of the flexible display is drawn out of the housing by using a sensor;

sequentially display a third user interface corresponding to a third page of the home screen and the second user interface on the at least a portion of the display area based on the identified degree as the display changes from the retracted state to the expanded state.

3. The electronic device of claim 1, wherein the object is included in a first specified folder, and wherein the instructions cause the electronic device to:

identify a degree at which the at least a portion of the display area of the flexible display is drawn out of the housing by using a sensor;

sequentially display the second user interface corresponding to a folder of a different level than the first specified folder on the at least a portion of the display area based on the identified degree as the display changes from the retracted state to the expanded state.

4. The electronic device of claim 1, wherein the at least a portion of the display areas includes a first sub-area and a second sub-area different from the first sub-area, wherein the instructions cause the electronic device to:

display the second user interface on the first sub-area based on identifying that the at least a portion of the display area is drawn out by a first length value; and display a third user interface on the second sub-area based on identifying that the at least a portion of the display area is drawn out by a second length value.

5. The electronic device of claim 4, wherein the instructions cause the electronic device to:

switch from the first user interface to the second user interface with a specified effect based on determining that the second user input related to the object is placed on the second user interface; and switch from the second user interface to the third user interface with a specified effect based on determining that the second user input related to the object is placed on the third user interface.

6. The electronic device of claim 4, wherein the first user interface, the second user interface and the third user interface respectively correspond to different pages of the home screen, and the instructions cause the electronic device to:

recognize that the second user input related to the object is placed on one of the second user interface or the third user interface;

recognize that the second user input related to the object is released from one of the second user interface or the third user interface; and perform a specified function of locating the object on a specified page corresponding to the user interface in which the second user input related to the object is released among the pages, based on recognizing that the second user input related to the object is released.

7. The electronic device of claim 4, wherein the instructions cause the electronic device to:

execute a specified application hierarchically including a plurality of folders having different levels;

recognize that the second user input related to the object and received on the first user interface corresponding to a first folder among the plurality of folders is located on the second user interface corresponding to a second folder among the plurality of folders;

recognize that the second user input related to the object is released from the second user interface; and perform a specified function of moving or copying the object to the second folder based on recognizing that the second user input related to the object is released from the second user interface, and wherein the second folder includes the first folder.

8. The electronic device of claim 4, wherein the second user interface corresponds to an interface for inputting a first specified type of object, wherein the third user interface corresponds to an interface for inputting a second specified type of object, and wherein the instructions cause the electronic device to:

allow the flexible display to display an input interface in the retracted state; and display the second user interface or the third user interface based on the first length value or the second length value while maintaining the input interface.

9. The electronic device of claim 4, wherein the instructions cause the electronic device to:

recognize that the second user input related to the object is located in one of the second user interface or the third user interface; and locate the object on a user interface in which the second user input related to the object is located based on the recognition.

10. The electronic device of claim 9, wherein the instructions cause the electronic device to:

recognize a user input received at the first user interface while the object is located in a user interface in which the user input related to the object is located;

55 56 determine a specified page among a plurality of pages based on the recognized user input; and perform the specified function of locating the object onto the specified page based on receiving a user input for locating the object onto the specified page.

11. A method of operating an electronic device which includes a flexible display having a display area including a first area and a second area, wherein the first area of the flexible display is exposed outside of a housing in a retracted state in which at least a portion of the display area is drawn into the housing, the first area and the second area of the flexible display are exposed outside of the housing in an expanded state in which the at least a portion of the display area is drawn out of the housing, the method comprising:

displaying a first user interface corresponding to a first page of a home screen including an object on the first area of the flexible display when the flexible display is in the retracted state, wherein the object comprises an icon representing an application, a folder, or a file;

receiving a first user input including a long touch input to select the object;

in response to receiving the first user input, changing a state of the flexible display from the retracted state to the expanded state to expose the second area to the outside of the housing and display a second user interface corresponding to a second page of the home screen on the exposed second area;

receiving a second user input including a drag input linked to the long touch input to move the object from the first user interface on the first area to the second user interface on the second area; and in response to receiving the second user input, moving the object to the second page of the home screen, wherein the drag input crosses from the first user interface to the second user interface.

12. The method of claim 11, further comprising:

identifying a degree at which the at least a portion of the display area of the flexible display is drawn out of the housing by using a sensor; and sequentially displaying the second user interface and a third user interface corresponding to a third page of the home screen on the at least a portion of the display area based on the identified degree as the flexible display changes from the retracted state to the expanded state.

13. The method of claim 11, wherein the object is included in a first specified folder, and further comprising:

identifying a degree at which the at least a portion of the display area of the flexible display is drawn out of the housing by using a sensor; and sequentially displaying the second user interface corresponding to a second folder of a different level than the first specified folder and a third user interface corresponding to a third folder of a different level than the first specified folder and the second folder on the at least a portion of the display area based on the identified degree as the flexible display changes from the retracted state to the expanded state.

14. The method of claim 11, wherein the at least a portion of the display areas includes a first sub-area and a second sub-area different from the first sub-area, and further comprising:

displaying the second user interface on the first sub-area based on determining that the at least a portion of the display area is drawn out by a first length value; and displaying a third user interface on the second sub-area based on determining that the at least a portion of the display area is drawn out by a second length value.

15. The method of claim 14, wherein the first user interface, the second user interface and the third user interface respectively correspond to different pages of the home screen, and further comprising:

performing a specified function related to the object, wherein the performing of the specified function related to the object includes:

recognizing that the second user input related to the object is placed on one of the second user interface or the third user interface;

recognizing that the second user input related to the object is released from one of the second user interface or the third user interface; and performing a specified function of locating the object on a specified page corresponding to the user interface in which the second user input related to the object is released among the pages, based on recognizing that the second user input related to the object is released.

16. The method of claim 14, further comprising:

executing a specified application hierarchically including a plurality of folders having different levels, and performing a specified function related to the object, wherein the performing of the specified function related to the object includes:

recognizing that the second user input related to the object and received on the first user interface corresponding to a first folder among the plurality of folders is located on the second user interface corresponding to a second folder among the plurality of folders;

recognizing that the second user input related to the object is released from the second user interface; and performing a specified function of moving or copying the object to the second folder based on recognizing that the second user input related to the object is released from the second user interface, and wherein the second folder includes the first folder.

* * * * *